United States Patent
Venugopal et al.

(10) Patent No.: US 12,445,975 B2
(45) Date of Patent: Oct. 14, 2025

(54) MODEL-BASED UPLINK-DOWNLINK CHANNEL TRACKING

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 17/805,213

(22) Filed: Jun. 2, 2022

(65) Prior Publication Data

US 2023/0397122 A1    Dec. 7, 2023

(51) Int. Cl.
| | |
|---|---|
| *H04W 24/10* | (2009.01) |
| *H04L 5/00* | (2006.01) |
| *H04W 52/14* | (2009.01) |
| *H04W 52/32* | (2009.01) |
| *H04W 52/36* | (2009.01) |

(52) U.S. Cl.
CPC ......... *H04W 52/325* (2013.01); *H04L 5/0051* (2013.01); *H04W 24/10* (2013.01); *H04W 52/146* (2013.01); *H04W 52/367* (2013.01)

(58) Field of Classification Search
CPC ............. H04W 52/325; H04W 52/146; H04W 52/367; H04W 24/10; H04L 5/0051
See application file for complete search history.

(56) References Cited

U.S. PATENT DOCUMENTS

| | | | |
|---|---|---|---|
| 2013/0077514 A1* | 3/2013 | Dinan | H04L 5/0053 370/252 |
| 2018/0097595 A1* | 4/2018 | Huang | H04L 1/0009 |
| 2018/0368083 A1* | 12/2018 | Yang | H04B 7/0486 |
| 2019/0166514 A1* | 5/2019 | Liu | H04L 5/0057 |
| 2020/0052852 A1* | 2/2020 | Vitthaladevuni | H04L 5/0053 |
| 2020/0204406 A1* | 6/2020 | Zhang | H04B 7/0456 |
| 2021/0219161 A1* | 7/2021 | Hu | H04W 24/08 |
| 2022/0039026 A1* | 2/2022 | Sharma | H04W 52/242 |
| 2022/0294666 A1* | 9/2022 | Jeon | H04L 25/0254 |
| 2023/0155702 A1* | 5/2023 | Wang | H04L 25/0202 370/252 |
| 2023/0379030 A1* | 11/2023 | Sun | H04B 7/0632 |
| 2024/0039799 A1* | 2/2024 | Parichehrehteroujeni | H04L 1/0009 |

* cited by examiner

*Primary Examiner* — Kevin T Bates
*Assistant Examiner* — Hector Reyes
(74) *Attorney, Agent, or Firm* — Procopio, Cory, Hargreaves & Savitch LLP

(57) ABSTRACT

Apparatus, methods, and computer-readable media for facilitating model-based uplink-downlink channel tracking are disclosed herein. An example method for wireless communication at a UE includes receiving, from a network node, a model configuration indicative of a model condition of a channel between the UE and the network node. The example method also includes receiving a measurement resource from the network node to measure a condition of the channel. The example method also includes transmitting, to the network node, an SRS. The example method also includes transmitting, to the network node, noise covariance information for the model configuration based on a measurement of the condition of the channel, the noise covariance information associated with the SRS.

30 Claims, 16 Drawing Sheets

MODEL-BASED UPLINK-DOWNLINK CHANNEL TRACKING

TECHNICAL FIELD

The present disclosure relates generally to communication systems, and more particularly, to wireless communications utilizing channel variation tracking.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. An apparatus may include a user equipment (UE). The example apparatus may receive, from a network node, a model configuration indicative of a model condition of a channel between the UE and the network node. The example apparatus may also receive a measurement resource from the network node to measure a condition of the channel. Additionally, the example apparatus may transmit, to the network node, a sounding reference signal (SRS). The example apparatus may also transmit, to the network node, noise covariance information for the model configuration based on a measurement of the condition of the channel, the noise covariance information associated with the SRS.

In another aspect of the disclosure, a method, a computer-readable medium, and an apparatus are provided for wireless communication. An apparatus may include a network node, such as a base station or a component of a base station. The example apparatus may output a model configuration indicative of a model condition of a channel between the network node and a UE. The example apparatus may also output a measurement resource to the UE to measure a condition of the channel. Additionally, the example apparatus may obtain an SRS. The example apparatus may also obtain noise covariance information for the model configuration based on a measurement of the condition of the channel, the noise covariance information associated with the SRS. The example apparatus may also track a variation in the condition of the channel relative to a first model condition of the channel, the first model condition being based on the SRS and the noise covariance information.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
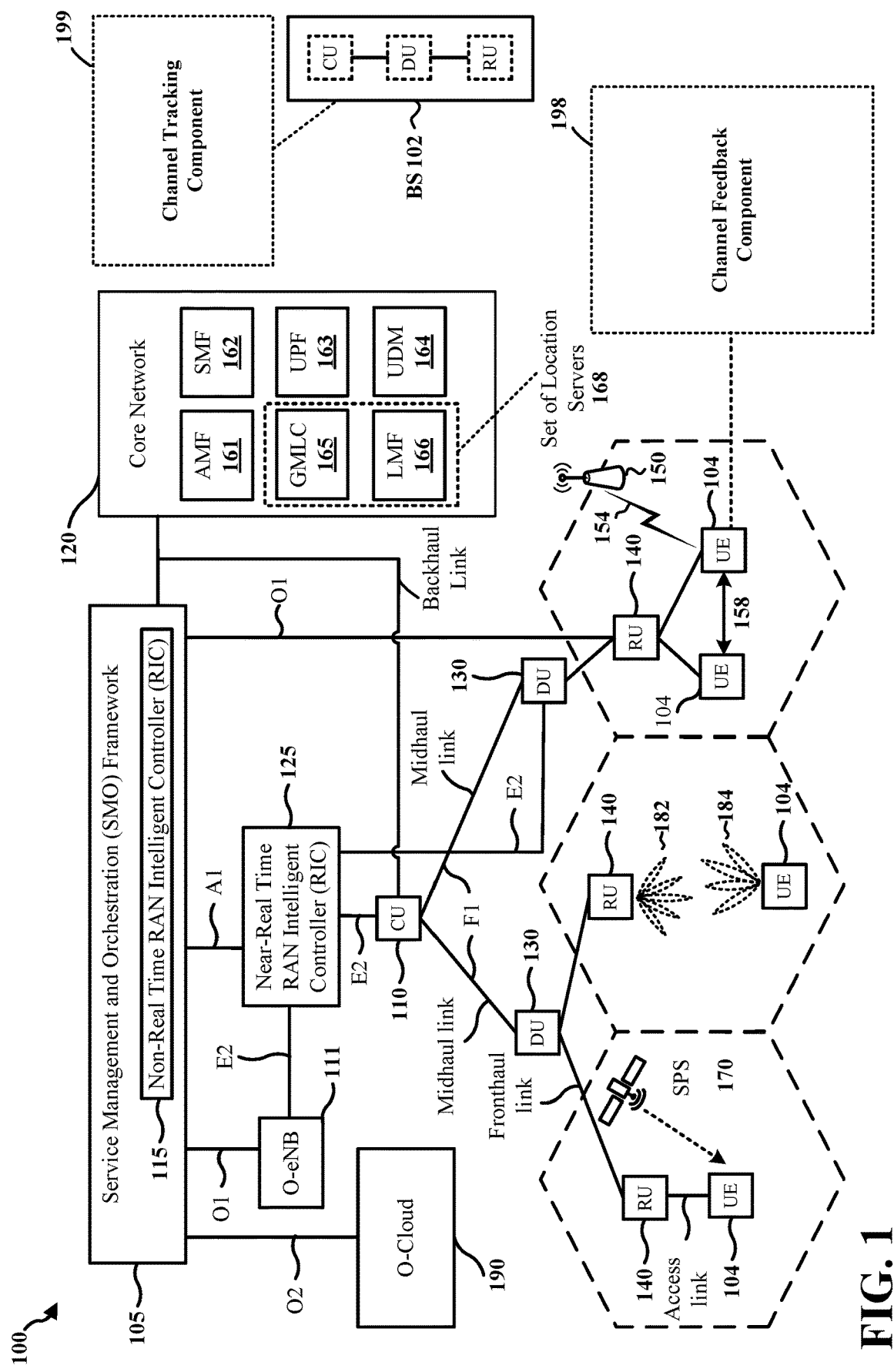
FIG. 1 is a diagram illustrating an example of a wireless communications system and an access network.

The measurement and reporting of channel state information (CSI) may be used to adjust and improve communication, such as communication between a UE and network. In some aspects, such as high mobility scenarios, performance loss may occur based on channel variations that may occur more frequently than CSI updates. Examples of high mobility scenarios include UE speeds of 30-500 kilometers per hour (kmph), applications associated with Industrial IoT (IIoT) procedures, automotive applications, highway applications, high-speed train (HST) applications, etc. Although the CSI reporting rate can be increased, the increased uplink and downlink CSI overhead may reduce system throughput. Additionally, more frequent measurements, transmissions (e.g., of reference signals), and/or reporting uses additional battery power at a UE.

Aspects disclosed herein facilitate model-based uplink-downlink channel tracking that may address channel variations. Such aspects may improve communications between a UE and network by, for example, conserving wireless resources and reducing signaling overhead. In some examples, a reduction of the overhead may be advantageous for high mobility use cases, such as for UEs moving at speeds of 30-500 kmph, applications associated with IIoT procedures, automotive applications, highway application, high-speed train applications, etc.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs (e.g., a CU 110) that can communicate directly with a core network 120 via a backhaul link, or indirectly with the core network 120 through one or more disaggregated base station units (such as a Near-Real Time (Near-RT) RAN Intelligent Controller (RIC) (e.g., a Near-RT RIC 125) via an E2 link, or a Non-Real Time (Non-RT) RIC 115 associated with a Service Management and Orchestration (SMO) Framework (e.g., an SMO Framework 105), or both). A CU 110 may communicate with one or more DUs (e.g., a DU 130) via respective midhaul links, such as an F1 interface. The DU 130 may communicate with one or more RUs (e.g., an RU 140) via respective fronthaul links. The RU 140 may communicate with respective UEs (e.g., a UE 104) via one or more radio frequency (RF) access links. In some implementations, the UE 104 may be simultaneously served by multiple RUs.

Each of the units, i.e., the CUs (e.g., a CU 110), the DUs (e.g., a DU 130), the RUs (e.g., an RU 140), as well as the Near-RT RICs (e.g., the Near-RT RIC 125), the Non-RT RICs (e.g., the Non-RT RIC 115), and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 140 can be implemented to handle over the air (OTA) communication with one or more UEs (e.g., the UE 104). In some implementations, real-time and non-real-time aspects of control and user plane communication with the RU 140 can be controlled by a corresponding DU. In some scenarios, this configuration can enable the DU(s) and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs (e.g., the RU 140) and the UEs (e.g., the UE 104) may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UE 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication (e.g., a D2D communication link 158). The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with a UE 104 (also referred to as Wi-Fi stations (STAs)) via communication link 154, e.g., in a 5 GHz unlicensed frequency spectrum or the like. When communicating in an unlicensed frequency spectrum, the UE 104/Wi-Fi AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) (e.g., an AMF 161), a Session Management Function (SMF) (e.g., an SMF 162), a User Plane Function (UPF) (e.g., a UPF 163), a Unified Data Management (UDM) (e.g., a UDM 164), one or more location servers 168, and other functional entities. The AMF 161 is the control node that processes the signaling between the UE 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) (e.g., a GMLC 165) and a Location Management Function (LMF) (e.g., an LMF 166). However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station (e.g., the base station 102). The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a device in communication with a network node, such as a UE 104 in communication with a base station 102, may be configured to manage one or more aspects of wireless communication. For example, the UE 104 may include a channel feedback component 198 configured to facilitate providing model-based uplink-downlink channel tracking that may address channel variations while also conserving wireless resources and reducing signaling overhead.

In certain aspects, the channel feedback component 198 may be configured to receive, from a network node, a model configuration indicative of a model condition of a channel between the UE and the network node. The example channel feedback component 198 may also be configured to receive a measurement resource from the network node to measure a condition of the channel. Additionally, the example channel feedback component 198 may be configured to transmit, to the network node, an SRS. The example channel feedback component 198 may also be configured to transmit, to the network node, noise covariance information for the model configuration based on a measurement of the condition of the channel, the noise covariance information associated with the SRS.

In another configuration, a network node, such as the base station 102 or a component of the base station 102 (e.g., the CU 110, the DU 130, and/or the RU 140), may be configured to manage or more aspects of wireless communication. For example, the base station 102 may include a channel tracking component 199 configured to facilitate providing model-based uplink-downlink channel tracking that may address channel variations while also conserving wireless resources and reducing signaling overhead.

In certain aspects, the channel tracking component 199 may be configured to output a model configuration indicative of a model condition of a channel between the network node and a UE. The example channel tracking component 199 may also be configured to output a measurement resource to the UE to measure a condition of the channel. Additionally, the example channel tracking component 199 may be configured to obtain an SRS. The example channel tracking component 199 may also be configured to obtain noise covariance information for the model configuration based on a measurement of the condition of the channel, the noise covariance information associated with the SRS. Additionally, the example channel tracking component 199 may be configured to track a variation in the condition of the channel relative to a first model condition of the channel, the first model condition being based on the SRS and the noise covariance information.

The aspects presented herein may enable tracking channel variations, which may facilitate adjusting and improving communication between a UE and network, for example, by conserving wireless resources and reducing signaling overhead.

Although the following description provides examples directed to 5G NR (and, in particular, to channel tracking), the concepts described herein may be applicable to other similar areas, such as LTE, LTE-A, CDMA, GSM, and/or other wireless technologies, in which a UE and network may adjust wireless communication based on channel variations.

Figure 2:
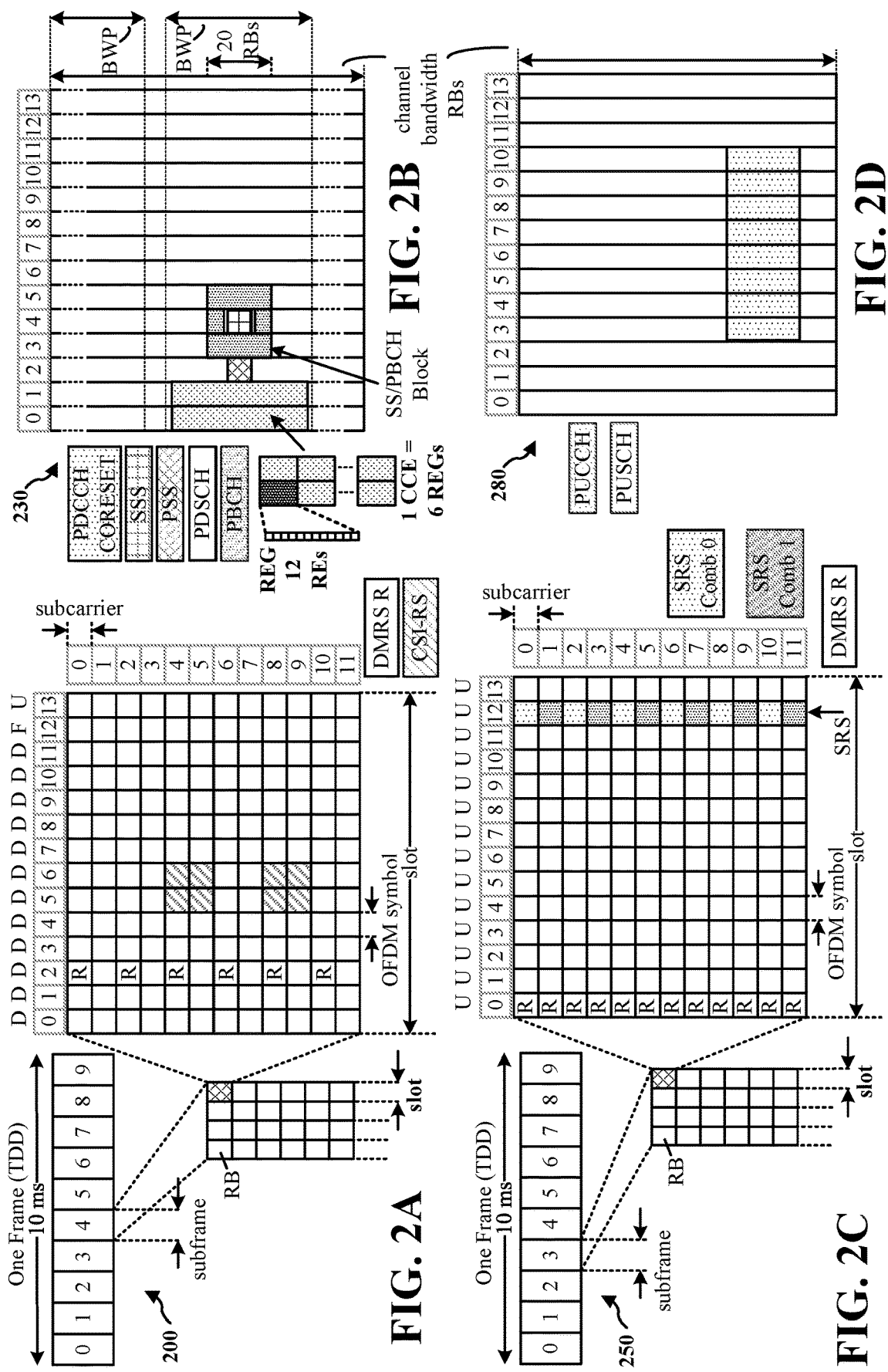
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. As shown in Table 1, the subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
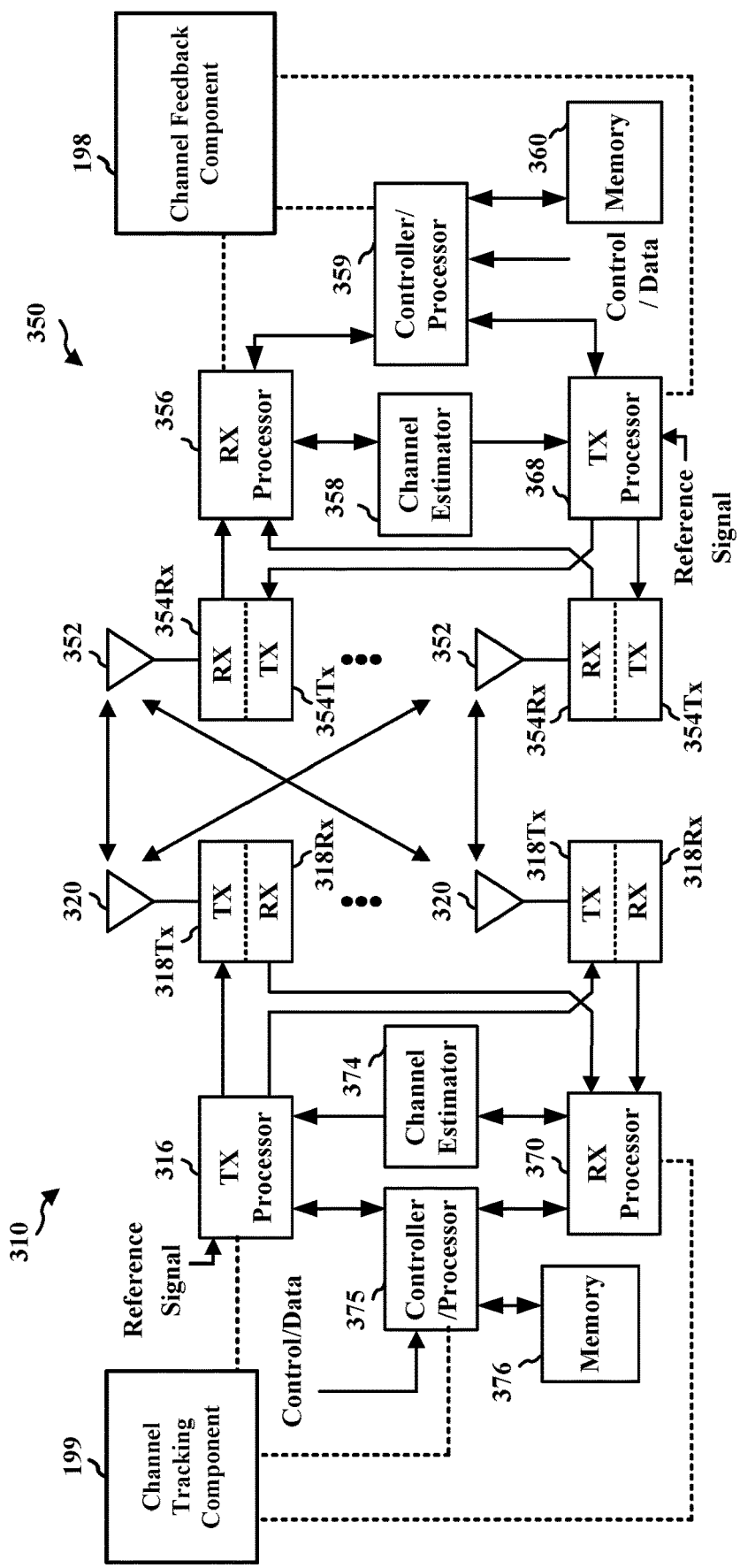
FIG. 3 is a diagram illustrating an example of a base station and user equipment (UE) in an access network.

FIG. 3 is a block diagram that illustrates an example of a first wireless device that is configured to exchange wireless communication with a second wireless device. In the illustrated example of FIG. 3, the first wireless device may include a base station 310, the second wireless device may include a UE 350, and the base station 310 may be in communication with the UE 350 in an access network. As shown in FIG. 3, the base station 310 includes a transmit processor (TX processor 316), a transmitter 318Tx, a receiver 318Rx, antennas 320, a receive processor (RX processor 370), a channel estimator 374, a controller/processor 375, and memory 376. The example UE 350 includes antennas 352, a transmitter 354Tx, a receiver 354Rx, an RX processor 356, a channel estimator 358, a controller/processor 359, memory 360, and a TX processor 368. In other examples, the base station 310 and/or the UE 350 may include additional or alternative components.

In the DL, Internet protocol (IP) packets may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna of the antennas 320 via a separate transmitter (e.g., the transmitter 318Tx). Each transmitter 318Tx may modulate a radio frequency (RF) carrier with a respective spatial stream for transmission.

At the UE 350, each receiver 354Rx receives a signal through its respective antenna of the antennas 352. Each receiver 354Rx recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, two or more of the multiple spatial streams may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna of the antennas 352 via separate transmitters (e.g., the transmitter 354Tx). Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna of the antennas 320. Each receiver 318Rx recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the channel feedback component 198 of FIG. 1.

At least one of the TX processor 316, the RX processor 370, and the controller/processor 375 may be configured to perform aspects in connection with the channel tracking component 199 of FIG. 1.

The measurement and reporting of CSI may be used to adjust and improve communication, such as communication between a UE and network. In some aspects, such as high mobility situations, performance loss may occur based on channel variations that may occur more frequently than CSI updates. Although the CSI reporting rate can be increased, the increased uplink and downlink CSI overhead may reduce system throughput. Additionally, more frequent measurements, transmissions (e.g., of reference signals), and/or reporting uses additional battery power at a UE. As an example, a UE may transmit SRS to enable uplink based measurements. Aspects presented herein provide for model based CSI tracking that may address channel variations while also conserving wireless resources and avoiding additional CSI overhead.

Reducing an overhead associated with channel state information (CSI) measurement and CSI reporting may increase a performance of a first network entity, such as a UE, and/or a second network entity, such as a base station or a component of a base station. For example, reducing a number of CSI measurements may increase a system throughput between the first network entity and the second network entity. However, reducing the number of CSI measurements may also reduce a quality of the CSI, as more CSI measurements may provide increased measurement accuracy, but may also increase the overhead. A reduction of the overhead may be advantageous for high mobility use cases, such as for UEs moving at speeds of 30-500 kilometers per hour (kmph), applications associated with Industrial IoT (IIoT) procedures, automotive applications, highway applications, high-speed train applications, etc.

Some Type II CSI feedback procedures may experience a performance loss even at moderate speeds of the UE, such as 10-30 kmph. Performance loss may occur based on a channel variation being too fast for a CSI measurement/update rate (i.e., a frequency at which the CSI measurement and CSI reporting is performed by the UE). By a time that the UE performs the CSI measurement and reports the CSI measurement to the scheduling entity (e.g., second network entity), the CSI report may become outdated. Thus, subsequent transmissions or pre-coding procedures that are based on the CSI measurement and the CSI report may not be accurate. For example, a mismatch may occur between the indicated CSI measurement and the actual channel conditions through which a signal may be propagated. Type II/enhanced TypeII (eType II) procedures for tracking the CSI feedback may also include increased CSI processing times in comparison to Type-I single panel (SP) CSI feedback procedures.

The CSI measurement/update rate may be increased based on a channel variation rate. As an example, a UE may be requested to report the CSI feedback to the network more frequently for tracking an increased variability of the channel. A request for tracking the increased variability of the channel may also be transmitted in the reverse direction. Such requests may generate an increased downlink/uplink resource overhead affecting system throughput (e.g., may decrease system throughput). Additionally, more frequent reporting occasions by the UE may also increase UE battery consumption. Aspects presented herein help to improve CSI feedback and tracking procedures with less associated overhead.

Although the above description describes an example in which the network node requests the UE to report CSI feedback, in other examples, the request for more frequent tracking of a channel, for example, in scenarios associated with increased variability of a channel, may be transmitted in the reverse direction from the UE to the network node.

In some examples, a CSI feedback rate (e.g., performing a CSI measurement and reporting the CSI measurement) may be adjusted at the UE based on a channel coherence time. The channel coherence time may refer to a period during which the channel is assumed to be quasi-static. In such scenarios, the UE may send a CSI report once during the period. When the channel variation and the mobility of the UE is low, the channel coherence time may be large, which may allow the CSI feedback rate to be low. That is, the update rate may be a function of the channel coherence time. A channel that is fast varying may correspond to an increased CSI feedback rate. If the channel coherence time is too short for highly mobile network entities (e.g., UEs) associated with a fast/frequent CSI feedback rate, an adaptive approach based on the channel coherence time may still result in significant signaling configuration (or reconfiguration) overhead, such as when the mobility of the UE is non-uniform. For example, as the mobility changes, multiple configurations and signaling updates may be used to indicate information to the UE and receive CSI feedback from the UE indicative of the mobility of the UE and/or parameters to use for measuring and reporting the CSI feedback. Thus, while such an adaptive approach may avoid or reduce channel tracking being outdated, the configurations needed for providing CSI feedback may need to be dynamically updated frequently, thereby increasing overhead.

In some examples, Doppler domain information associated with the CSI feedback may be used to indicate timing information for frequency domain (FD) codebooks and/or spatial domain (SD) codebooks. For example, Doppler domain compression may be based on a channel correlation time. For mmW communications and higher bands, such as FR2, FR4, etc., the CSI feedback may be compressed in the Doppler domain in addition to the frequency domain and/or the spatial domain. The CSI feedback may be indicative of precoder entries in a Type-II codebook. While such techniques may provide improved channel tracking with less frequent CSI reporting occasions, the codebook size and the reporting overhead may be increased. Additionally, a CSI processing time for each report at the UE may be higher than a processing time for Type-II CSI reporting procedures and/or eType-II CSI reporting procedures.

In some examples, DM-RS based CSI feedback adjustments may be performed based on a PMI and/or an RI/CQI. In addition to tracking the channel based on CSI resources, the DM-RS of scheduled downlink transmissions may be used for adjusting a previous CSI feedback report from the UE. Additional signaling may be performed with the downlink traffic to associate DM-RS resources with previous CSI resources/reports. The channel may be modeled as a time-varying, multi-path complex channel based on a linear combination of narrowband, time-invariant components, with CSI feedback via the PMI, RI, layer indicator (LI), CQI, etc.

While the channel may be modeled in some scenarios as a time-varying wideband channel, a model-based representation of the channel may also be configured to track the channel variation with reduced overhead. In some examples, the model may be updated periodically at a transmitting node and the receiving node such that a same model may be used to predict a future CSI without performing a corresponding measurement. For example, the model may be based on a state-space channel profile where each state may correspond to a sparse representation of the channel in a multi-dimensional space. Procedures associated with the model-based representation of the channel may be similar to a delta CSI update for tracking the channel for CSI feedback, but may be further compressed based on a model configuration communicated between the transmitting node and the receiving node.

Figure 4:
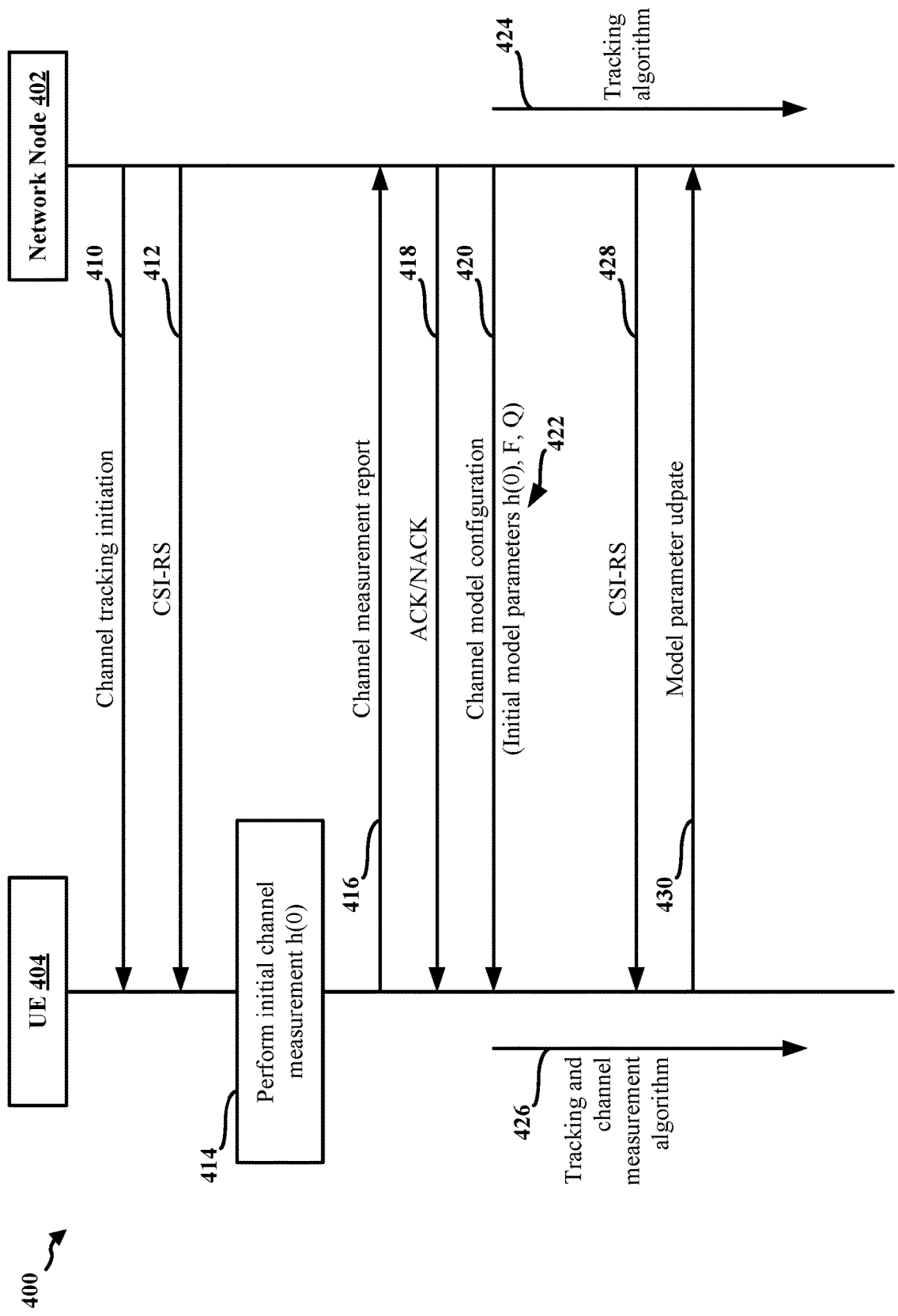
FIG. 4 is a call flow diagram illustrating a model-based channel compression technique, in accordance with various aspects of the present disclosure.

FIG. 4 illustrates an example communication flow 400 between a first node, such as a network node 402, and a second node, such as a UE 404, as presented herein. Although the example is described for a UE and a network node such as a base station, in other examples, the communication flow may include the use of a tracking algorithm to reduce reporting for sidelink communication (e.g., the first node and the second node may both be UEs), or may be performed by two network nodes (e.g., with the first node and the second node each being a base station, a component of a base station, an IAB node, etc.) One or more aspects described for the network node 402 may be performed by a base station or a component of a base station or a network entity, such as a CU, a DU, and/or an RU. Aspects of the network node 402 may be implemented by the base station 102 of FIG. 1 and/or the base station 310 of FIG. 3. Aspects of the UE 404 may be implemented by the UE 104 of FIG. 1 and/or the UE 350 of FIG. 3. Although not shown in the illustrated example of FIG. 4, it may be appreciated that in additional or alternative examples, the network node 402 may be in communication with one or more other base stations or UEs, and/or the UE 404 may be in communication with one or more other network nodes or UEs.

In the illustrated example, the communication flow 400 facilitates the UE 404 and the network node 402 performing a model-based channel compression technique. The communication flow 400 may reduce an overhead associated with CSI measurement and CSI reporting, which may increase a performance at the network node 402 and/or the UE 404.

As shown in FIG. 4, the network node 402 may transmit a channel tracking initiation communication 410 that is received by the UE 404. The channel tracking initiation communication 410 may indicate to the UE 404 that the network node 402 is performing channel tracking (e.g., a channel tracking algorithm 424). The channel tracking initiation communication 410 may additionally, or alternately, initiate the UE 404 to perform channel tracking and CSI feedback procedures (e.g., a channel tracking and channel measurement algorithm 426).

The network node 402 may transmit a channel measurement resource 412 that is received by the UE 404. The channel measurement resource 412 may include a CSI reference signal (CSI-RS). The CSI-RS may be a periodic CSI-RS, a semi-persistent CSI-RS, or an aperiodic CSI-RS.

At 414, the UE 404 may perform an initial channel measurement to obtain a measurement of the channel (e.g., h(0)). The UE 404 may perform the initial channel measurement based on the channel measurement resource 412 received from the network node 402. The UE 404 may transmit a channel measurement report 416 that is received by the network node 402. The channel measurement report 416 may include the initial channel measurement (h(0)).

In some examples, the network node 402 may transmit an ACK/NACK 418 that is received by the UE 404. The ACK/NACK 418 may indicate that the network node 402 received the channel measurement report 416 (e.g., an ACK), or may indicate that the network node 402 did not receive the channel measurement report 416 (e.g., a NACK).

As shown in FIG. 4, the network node 402 may transmit a channel model configuration 420 that is received by the UE 404. The channel model configuration 420 may include initial model parameters 422. For example, the initial model parameters 422 may include an initial channel state h(0), a state transition matrix (F), and a state space noise covariance (Q). The channel model configuration and the initial model parameters 422 may be used by the network node 402 and the UE 404 to ensure that both nodes are using a same model to predict CSI.

As described above, the model may be based on a state-space channel profile where each state may correspond to a sparse representation of the channel in a multi-dimensional space (e.g., in the time domain, the frequency domain, and the spatial domain). The model-based representation of the channel may be defined by a state-space model and an observation model. The state-space model may be defined by Equation 1 (below) and the observation model may be defined by Equation 2 (below).

$$h(n)=F\,h(n-1)+w(n) \quad \text{Equation 1:}$$

$$z(n)=h(n)+v(n) \quad \text{Equation 2:}$$

In Equation 1, the term "h(n)" is a matrix that represents the state of the channel at a time n, the term "h(n−1)" is a matrix that represents the state of the channel at a previous time (n−1), the term "F" is a state transition matrix given a current state space, and the term "w(n)" is a matrix that corresponds to a process noise, which may be modeled as a circular symmetric complex Gaussian random variable denoted by CN(0, Q), where CN is indicative of a complex normal distribution. In Equation 2, the term "z(n)" is a matrix that represents an observation at time n based on the channel "h(n)" and a measurement noise "v(n)" may be modeled as a circular symmetric complex Gaussian random variable denoted by C N (0, R). The parameters F, Q, and R may correspond to portions of the model configuration that are commonly known between the UE 404 and the network node 402, or which may be agreed or otherwise signaled between the UE 404 and the network node 402. The state-space model h(n) may be indicative of the channel to be measured, whereas the state transition matrix F may represent part of the model configuration between the UE 404 and the network node 402. At each observation instance z(n), the nodes may apply the state transition matrix F to a previous observation to determine a current state. At least one of the nodes may measure the channel (e.g., the UE 404), which may include the state. The measurement process may be noisy in some scenarios. Thus, covariance in the system may be associated with unknown variables.

The use of the model may be based on the assumption that the nodes (e.g., the UE 404 and the network node 402) are tracking a particular beam pair, which is associated with a given CRI (CSI resource). As an example, the network node 402 uses a particular spatial filter, and the UE 404 uses a particular spatial filter. For the beam-pair, the time-frequency variation is tracked by the h(n) model. The model parameters include F that represents the state transition matrix, which tracks what the next state space is given the current state-space and is influenced by noise w(n), which is modeled as a complex noise, with a known parameter for the covariance Q. Thus, F and Q are a part of the model for the channel.

When there is an observation, e.g., in terms of a CSI-RS transmission from the network node 402, the UE 404 can measure the state-space through an observation model z(n)=h(n)+v(n), where h(n) represents the state space, and v(n) represents the noise. The covariance of the noise (e.g., covariance R) is known by the UE. The network node 402 may not need to know the parameter R for updating its own tracking loop, because the tracking is based on the state transition equation h(n).

Based on an observation, the UE 404 and the network node 402 may perform Kalman filtering to update the state-space. Based on the observation, e.g., measurement, at z(n) and a prediction $\hat{h}$, the UE 404 and/or the network node 402 may determine an innovation, e.g., y(n) at slot n.

In some examples, rather than reporting a differential channel state (e.g., based on Δh(n)=h(n)−h(n−1)), a model-based update (e.g., based on $K_n y(n)$, where $K_n$ corresponds to a Kalman gain/filter coefficient at time n, and y(n) corresponds to a signal at time n based on the observation model and the state-space model) may be reported from the first node, e.g., the network node 402, to the second node, e.g., the UE 404. The actual update to the channel may be represented by $\hat{h}(n|n)$ and may be based on the Kalman update. The same state-space model and Kalman filtering procedure may be used at both nodes to predict a future channel corresponding to $\hat{h}(n+k|n)$. Instead of applying the state-space model to determine the channel h(n), similar state-space models may also be applied to other channel state feedback (CSF) metrics, such as CQI, PMI, etc., to determine channel information. In this example, h indicates the prediction of the state space at a slot n given information until slot n−1. The Kalman filtering procedure may be represented as:

$$y(n)=z(n)-\hat{h}(n|n-1)$$

$$S_n=P_{n|n-1}+R$$

$$K_n=P_{n|n-1}S_n^{-1}$$

$$\hat{h}(n|n) = \hat{h}(n|n-1) + K_n y(n)$$

$$P_{n|n} = (I - K_n) P_{n|n-1}$$

Where $S_n$ represents the covariance of y(n). In this example, y(n) is a function of the estimate of h(n) and the observation z(n). Thus, $S_n$ is the covariance of the observation model noise and the state space model noise. $P_n$ is the covariance of $\hat{h}(n)$.

Irrespective of an observation (e.g., a CSI transmission or measurement), both nodes (for example, a UE and a base station) and UE can track h using the state transition model using $\hat{h}(n|n-1) = F\hat{h}(n-1|n-1)$.

When an observation is available at a time instance n, the measuring entity, e.g., the second node (e.g., the UE 404), can provide the (Kalman) update ($K_n y(n)$) to the other node (e.g., the network node 402) to update the channel model. A sampling duration may be the same as the CSI-RS periodicity, in which case tracking may be based on measurement of the CSI-RS. In other aspects, the tracking or sampling duration may be different than the CSI-RS periodicity. When an observation is not available at an instance n, the estimate may be indicated as:

$$\hat{h}(n|n) := \hat{h}(n|n-1)$$

$$P_{n|n} := P_{n|n-1}$$

As an example, when an observation is 0, it may be treated as a missed observation. In some aspects, the time stamp of updating the model for the channel may be decoupled from the measurement of the channel, and the tracking rate and the channel measurement rate may be signaled between the nodes, e.g., between the UE 404 and the network node 402. As an example, when a tracking periodicity is to be faster than a CSI-RS periodicity, then the tracking can still work by treating instances as missing observation, e.g., z(n)=0.

As described in connection with the channel tracking initiation communication 410, the network node 402 may signal the UE 404 to start the channel tracking. In order to initiate the channel tracking, e.g., sending the parameters F, Q, and an initial estimate of the channel h(0), which may be exchanged in signaling via the channel tracking initiation communication 410, the channel measurement report 416, and/or the ACK/NACK 418. The initial parameters of the model may be signaled together or may be sent separately.

In the example of FIG. 4, the network node 402 may execute a channel tracking algorithm 424 after transmitting the channel model configuration 420. The UE 404 may also execute a channel tracking and channel measurement algorithm 426 after receiving the channel model configuration 420. Thus, the UE 404 and the network node 402 may track channel variations. In some examples, both nodes (e.g., the UE 404 and the network node 402) may track channel variations for a beam pair (e.g., a CSI resource indicator (CRI)) based on a state-space model. It may be appreciated that different beam pairs may have different properties based on channel parameters. For example, different beam pairs may have a different delay spread, a different Doppler spread, etc. Thus, the channel model configuration 420 (and the initial model parameters 422) may be specific to a particular beam pair between the UE 404 and the network node 402.

As both nodes are tracking the channel based on a common model (e.g., based on the channel model configuration 420), whenever a change is detected by a node, the detecting node may indicate the change to the other node (e.g., the non-detecting node). For example, the network node 402 may transmit a channel measurement resource 428 that is received by the UE 404. The channel measurement resource 428 may include a CSI-RS, such as a periodic CSI-RS, a semi-persistent CSI-RS, or an aperiodic CSI-RS. The UE 404 may then transmit a model parameter update 430 that is received by the network node 402. The UE 404 may transmit the model parameter update 430 based on a channel measurement by the UE 404 indicative of a change in a condition of the channel. The UE 404 may transmit the model parameter update 430 via a CSI feedback procedure.

In some examples, the model parameter update 430 may correspond to a delta change measured by the UE 404, e.g., via the channel tracking and channel measurement algorithm 426.

Figure 5:
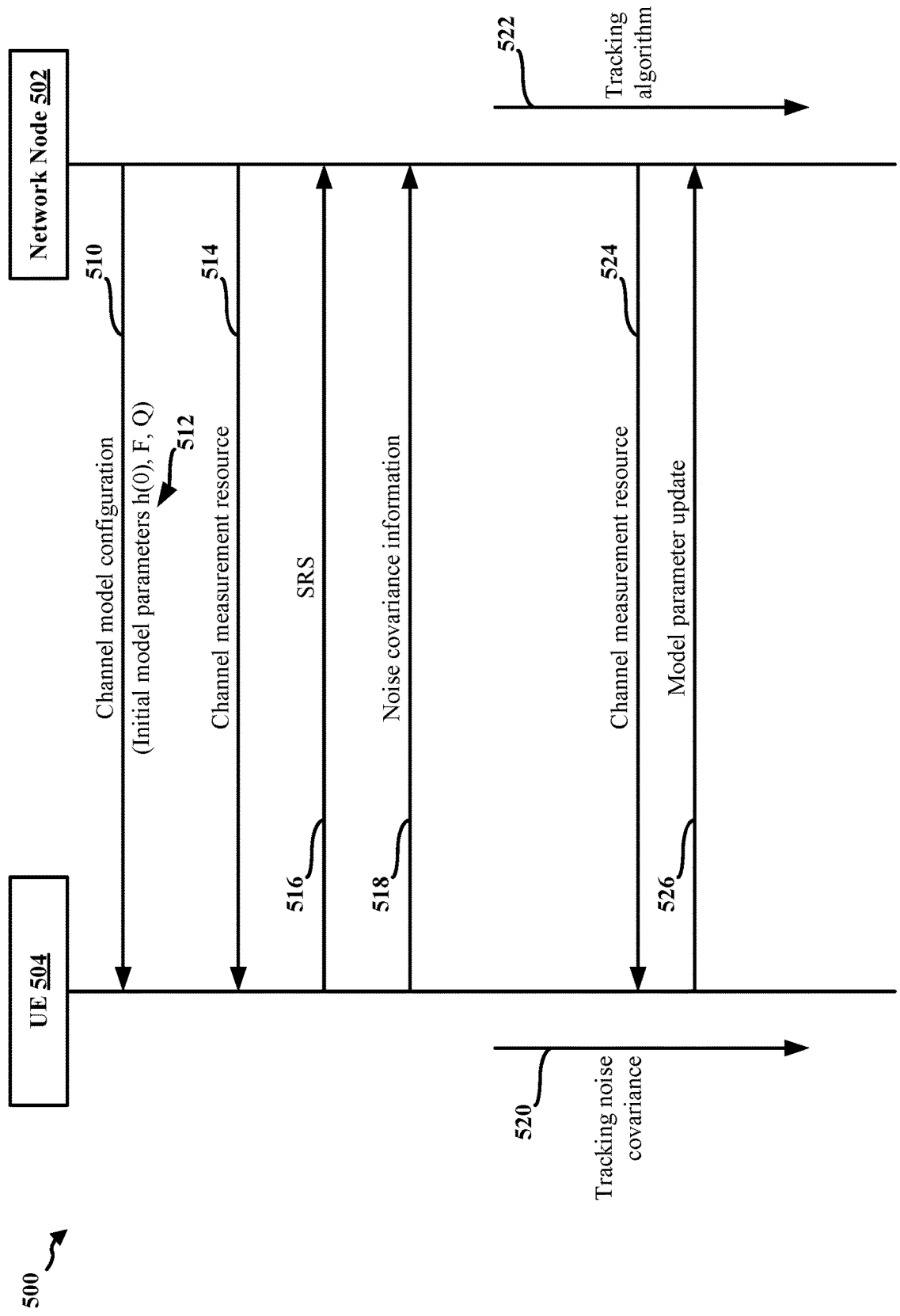
FIG. 5 is a call flow diagram illustrating communications between a network node and a UE, in accordance with various aspects of the present disclosure.

FIG. 5 illustrates an example communication flow 500 in which a tracking algorithm may be initiated in connection with one or more SRS transmissions from a first node (e.g., a UE 504) that are measured by a second node (e.g., a network node 502). Although the example is described for a UE and a network node such as a base station, in other examples, the communication flow may include the use of a tracking algorithm to reduce reporting for sidelink communication (e.g., the first node and the second node may both be UEs), or may be performed by two network nodes (e.g., with the first node and the second node each being a base station, a component of a base station, an IAB node, etc.) One or more aspects described for the network node 502 may be performed by a base station or a component of a base station or a network entity, such as a CU, a DU, and/or an RU. Aspects of the network node 502 may be implemented by the base station 102 of FIG. 1, the base station 310 of FIG. 3, and/or the network node 402 of FIG. 4. Aspects of the UE 504 may be implemented by the UE 104 of FIG. 1, the UE 350 of FIG. 3, and/or the UE 404 of FIG. 4. Although not shown in the illustrated example of FIG. 5, it may be appreciated that in additional or alternative examples, the network node 502 may be in communication with one or more other base stations or UEs, and/or the UE 504 may be in communication with one or more other network nodes or UEs.

FIG. 5 illustrates that the network node 502 may transmit a channel model configuration 510 that is received by the UE 504. Similar to the channel model configuration 420 in FIG. 4, the channel model configuration 510 may include initial model parameters. For example, the initial model parameters 512 may include an initial channel state h(0), a state transition matrix (F), and a state space noise covariance (Q). The channel model configuration 510 and the initial model parameters 512 may be used by the network node 502 and the UE 504 to ensure that both nodes are using a same model.

As described in connection with FIG. 4, the model may be based on a state-space channel profile where each state may correspond to a sparse representation of the channel in a multi-dimensional space (e.g., in the time domain, the frequency domain, and the spatial domain). The model-based representation of the channel may be defined by a state-space model and an observation model.

In contrast to FIG. 4, in which the UE sends the model parameter updates to the network based on measurements of a reference signal received by the UE, so that the network can update the model, in FIG. 5, the UE 504 may transmit a reference signal so that the network can update the model based on its own measurements. For example, in FIG. 5, the network node 502 may provide the UE 504 with a channel measurement resource 514, e.g., such as a configuration of resources for the transmission of a reference signal to the network node 502. Then, the UE 504 may transmit a reference signal, such as an SRS 516, using the channel measurement resource 514 indicated by the network node 502. The network node 502 may perform a measurement of the SRS 516 to estimate the channel, e.g., the initial channel measurement (h(0)) rather than receiving the measurement from the UE, as occurs via the channel measurement report 416 in FIG. 4. For example, procedure 522 may be based on a tracking and channel measurement algorithm, and procedure 520 may be based on a tracking algorithm such as a noise covariance tracking algorithm. For example, the UE and/or the network node may track variations in a channel relative to a model condition based on the channel model.

In some aspects, as shown in FIG. 5, the UE 504 may further receive a channel measurement resource 524, such as a CSI-RS or other reference signal, similar to the channel measurement resource 428 in FIG. 4, and may provide model update information to the network node 502, via a model parameter update 526, based on a measurement of the channel measurement resource 524, such as described in connection with FIG. 4.

Figure 6:
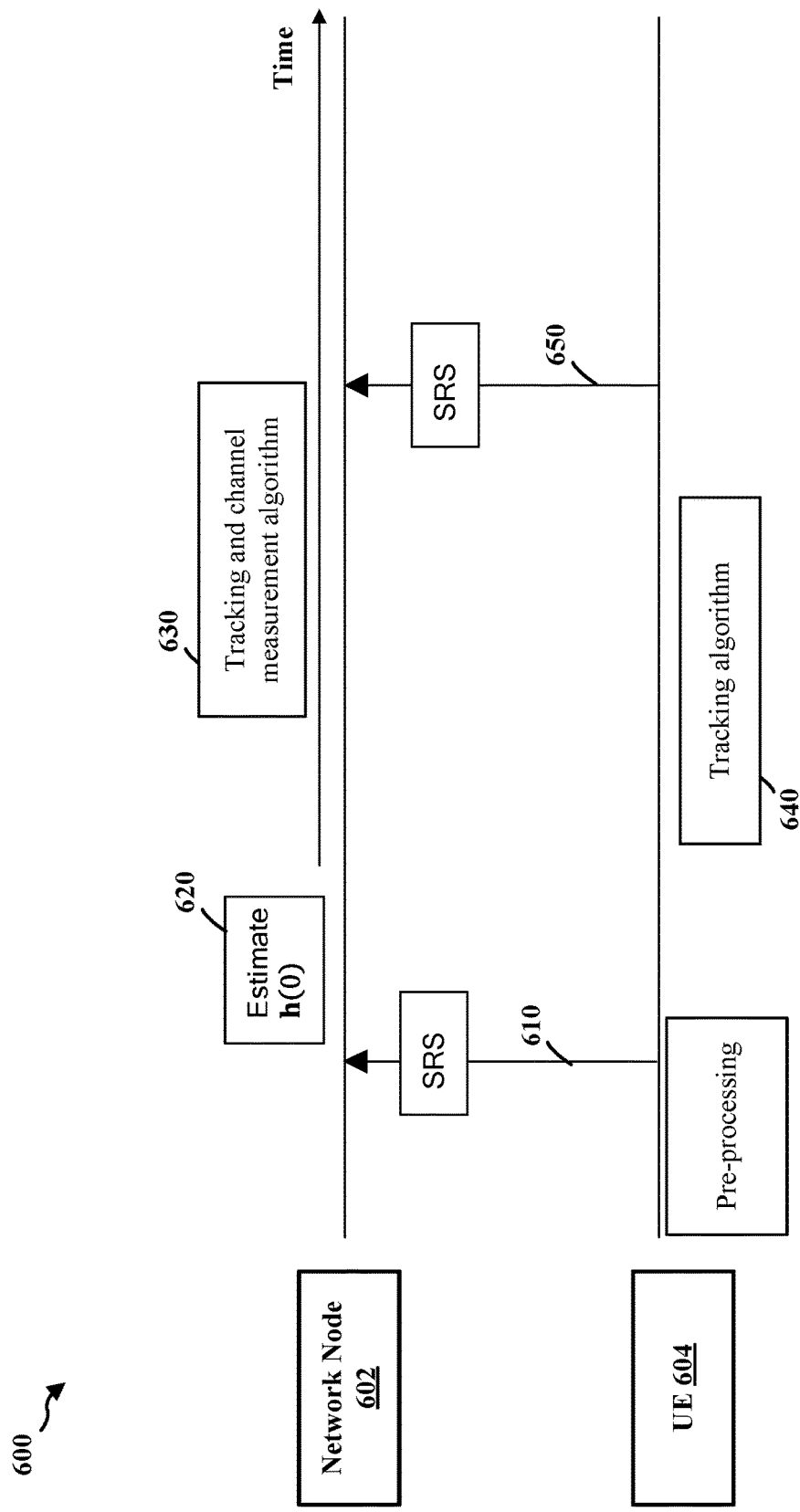
FIG. 6 is a call flow diagram illustrating a model-based channel tracking technique, in accordance with various aspects of the present disclosure.

The examples in FIGS. 4 and 5 are based on the UE 404 or the UE 504 tracking, measuring, and providing updates for the model to the network node that may also be tracking, measuring, and updating the model. FIG. 6 illustrates an example, in which the tracking, measuring, and updating may be performed at a network node.

FIG. 6 illustrates an example communication flow 600 in which a tracking algorithm may be used, e.g., and updated, in connection with SRS transmissions from a first device (e.g., a UE 604) that are measured by a second node (e.g., a network node 602). Although the example is described for a UE and a network node such as a base station, in other examples, the communication flow may include the use of a tracking algorithm to reduce reporting for sidelink communication (e.g., the first node and the second node may both be UEs), or may be performed by two network nodes (e.g., with the first node and the second node each being a base station, a component of a base station, an IAB node, etc.) One or more aspects described for the network node 602 may be performed by a base station or a component of a base station or a network entity, such as a CU, a DU, and/or an RU. Aspects of the network node 602 may be implemented by the base station 102 of FIG. 1, the base station 310 of FIG. 3, the network node 402 of FIG. 4, and/or the network node 502 of FIG. 5. Aspects of the UE 504 may be implemented by the UE 104 of FIG. 1, the UE 350 of FIG. 3, the UE 404 of FIG. 4, and/or the UE 504 of FIG. 5. Although not shown in the illustrated example of FIG. 6, it may be appreciated that in additional or alternative examples, the network node 602 may be in communication with one or more other base stations or UEs, and/or the UE 604 may be in communication with one or more other network nodes or UEs.

FIG. 6 illustrates that the UE 604 may transmit an SRS 610 that the network node 602 uses to estimate the channel, e.g., h(0), at 620, such as described in connection with the SRS 516 in FIG. 5. In FIG. 6, the network may track a channel, and may perform measurements of the channel, based on a tracking algorithm of a model configuration, at 630. For example, the network node 602 may track variations in a channel relative to a model condition based on the channel model. The UE 604 may transmit SRS transmissions, e.g., such as shown as SRS 650, that the network node 602 uses to measure the channel and compare it to the channel model. The network node may update the model based on the measurement of an SRS 650, e.g., rather than receiving the model updates from the UE based on a measurement of a downlink reference signal (e.g., such as the channel measurement resource 428). In some aspects, the UE 604 may also use a tracking algorithm, at 640 to track the channel. For example, the UE may track variations in a channel relative to a model condition based on the channel model. The tracking algorithm at the UE side may include any of the aspects described in connection with the channel tracking and channel measurement algorithm 426 of FIG. 4 and/or the procedure 520 of FIG. 5.

The model based channel tracking may enable the network node 602 to obtain a more accurate precoding. For example, the process may enable the network node 602 to adapt its precoders and its transmission strategies to better address, or track with, the channel variations. The network node 602 may be in a better position to determine a more accurate precoder and/or to adapt a CQI or other parameter of the communication with the UE 604. In order for the network node 602 to use the measurement of the SRS to perform its own tracking and to adapt its precoders and downlink transmission parameters to more accurately track with channel variations, it may be helpful for the network node to know whether the SRS is precoded, the particular precoding applied to the SRS, the relationship of precoding between different SRSs, and/or a covariance of noise at the UE. In a time division duplex (TDD)-based system, the network node 602 and the UE 604 may operate in a same frequency band, so that there is reciprocity. It may be helpful for the network node 402 to be aware of whether the SRS transmissions are precoded.

The SRS 610 may be precoded or non-precoded. The same precoding may be applied for the initial SRS transmission (e.g., the SRS 610) and the later SRS transmission (s) (e.g., the SRS 650). In other aspects, a different precoding may be applied for the different SRS transmissions. When the network node 602 tracks the channel based on the SRS, the network node 602 does not know a covariance of measurement noise, e.g., $R_{nn}$, which is associated with the UE when it receives a transmission from the network, e.g., a downlink noise covariance.

As an example, when the network node 602 tracks a channel h based on SRS, the network node 602 does not know the $R_{nn}$, to determine PMI, whereas when the UE 604 is measuring and reporting, the UE 604 can directly consider $R_{nn}$ and provide the feedback of the initial channel estimation h(0) accordingly.

If the UE 604 transmits a non-precoded SRS for the initial SRS 610, the network node 602 may not be aware of whether the subsequent SRS transmission, e.g., the SRS 650, will use the same precoding or non-precoding as the initial SRS 610. Aspects presented herein provide mechanisms for a base station to be aware of a relationship between SRS transmissions in order to measure subsequent SRS. In addition to, or alternative to, precoding, there may be various SRS transmission parameters that may be related between an initial SRS transmission (e.g., the SRS 610) and a subsequent SRS transmission (e.g., the SRS 650), such as panel switching or antenna switching. Aspects presented herein also provide for the base station to be aware of and account for a UE $R_{nn}$, e.g., the noise variance in the observation model. As $R_{nn}$ is observed noise variation for downlink communication, it is observed by the UE 604. The UE may pick the precoders for feeding back to let the network node know what to use for downlink transmissions by optimizing over the $R_{nn}$, observed at the UE. For an SRS transmission, the network node does not know the UE $R_{nn}$ (e.g., the noise covariance at the UE-side) to determine a corresponding PMI to use.

Figure 7:
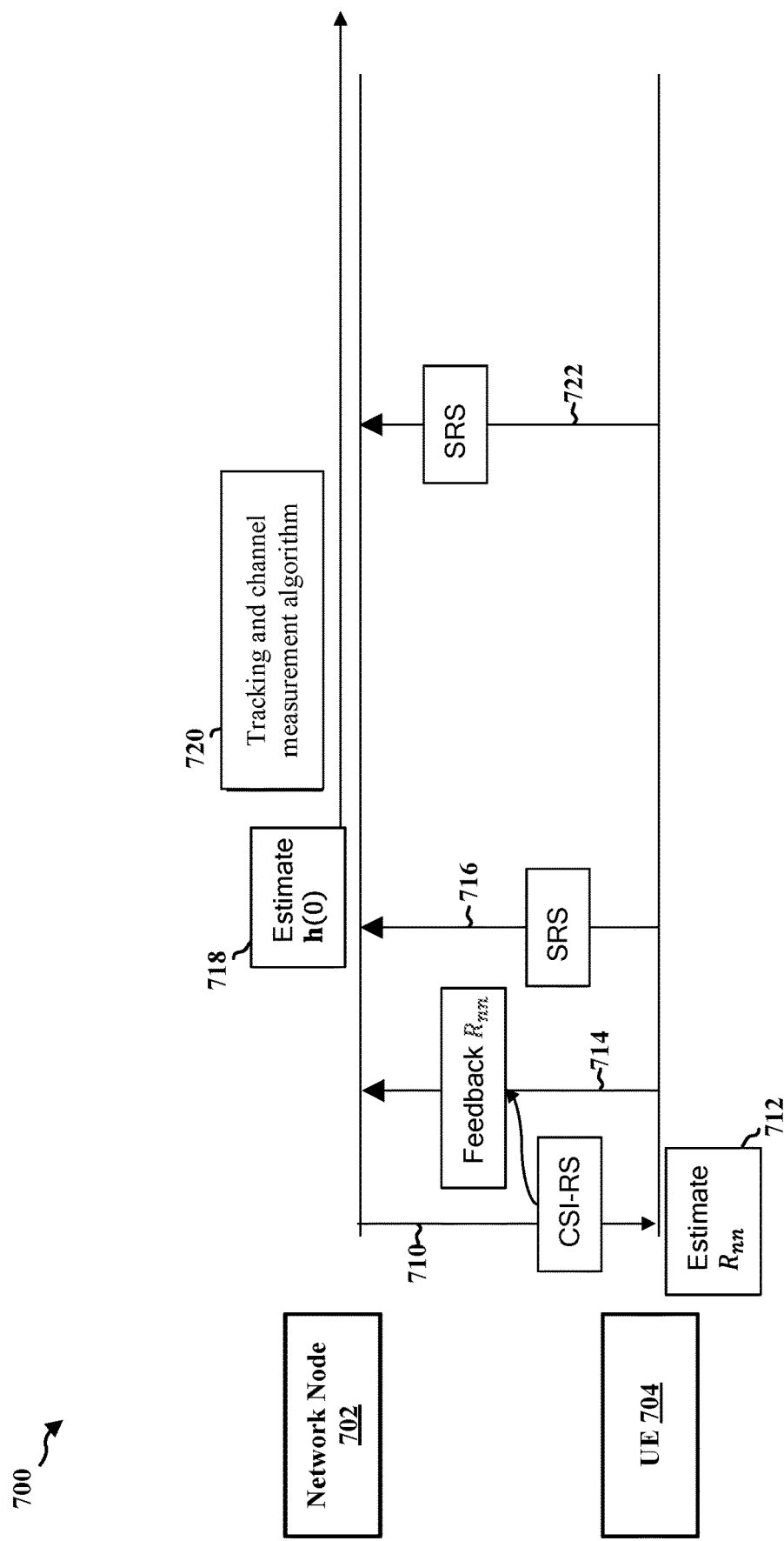
FIG. 7 is a call flow diagram illustrating a model-based channel tracking technique, in accordance with various aspects of the present disclosure.

FIG. 7 illustrates an example communication flow 700 between a network node 702 and a UE 704 with estimation of the channel h(0), at 718, based on an initial SRS transmission (e.g., an SRS 716) from the UE 704, and tracking and channel measurement based on a channel model, at 720. For example, the network node may track variations in a channel relative to a model condition based on the channel model. The channel measurements may be performed by the network node 702 based on SRS transmissions 722 from the UE 704. As illustrated in FIG. 7, the UE 704 may provide the $R_{nn}$ to the network node 702. Although the information provided to the network is referred to as "$R_{nn}$," the noise covariance information may also be referred to by another name or another parameter that indicates a noise covariance determined at a UE. FIG. 5 similarly illustrates an example in which the UE 504 may provide noise covariance information to the network node 502. FIG. 7 illustrates an example, in which the UE 704 may receive a reference signal, such as a CSI-RS 710, from the network node 702, estimates the $R_{nn}$ at 712, and provides the $R_{nn}$ to the network node 702 at 714. The UE 704 may then transmit the SRS 716 without precoding so that the channel tracking is performed by the network node 702 and not the UE 704. Such an example may minimize, or reduce, processing and computation complexity at the UE 704. As well, the UE 704 may provide the $R_{nn}$ without being aware of the channel tracking performed at 720 by the network node 702. FIG. 5 illustrates an example of a UE 504 providing noise covariant information 518.

In some aspects, a new metric may be used by the UE to report the $R_{nn}$, to the network node 702 as part of a CSI framework. In some aspects, the $R_{nn}$, may be estimated, or measured, by the UE 704 based on an interference measurement resource (IMR) such as a CSI-RS or based on a channel measurement resource, e.g., rather than a CSI-RS.

As the $R_{nn}$, includes, e.g., takes into account, both noise and interference, the value of $R_{nn}$ may change dynamically. As an example, noise statistics may be stable, while interference may change dynamically in each measurement occasion. In order to improve the efficiency of network side tracking, the UE may provide the $R_{nn}$, to the network node 702 in a periodic or semi-persistent manner or in an aperiodic or triggered manner. In some aspects, the network node 702 may request the $R_{nn}$ from the UE, and the request may trigger the UE to send the $R_{nn}$, to the network node. The timing and/or frequency of the $R_{nn}$ information, e.g., whether periodic, semi-persistent, or aperiodic may help enable the network node 702 to track the $R_{nn}$ and to adapt the network side precoding to address the variation in channel conditions.

In FIG. 7, the network node 702 may estimate the channel h(0) based on the non-precoded SRS (e.g., the SRS 716). The network node 702 may then work backward from the $R_{nn}$ received from the UE 704 to determine the physical channel experienced by the UE.

Figure 8:
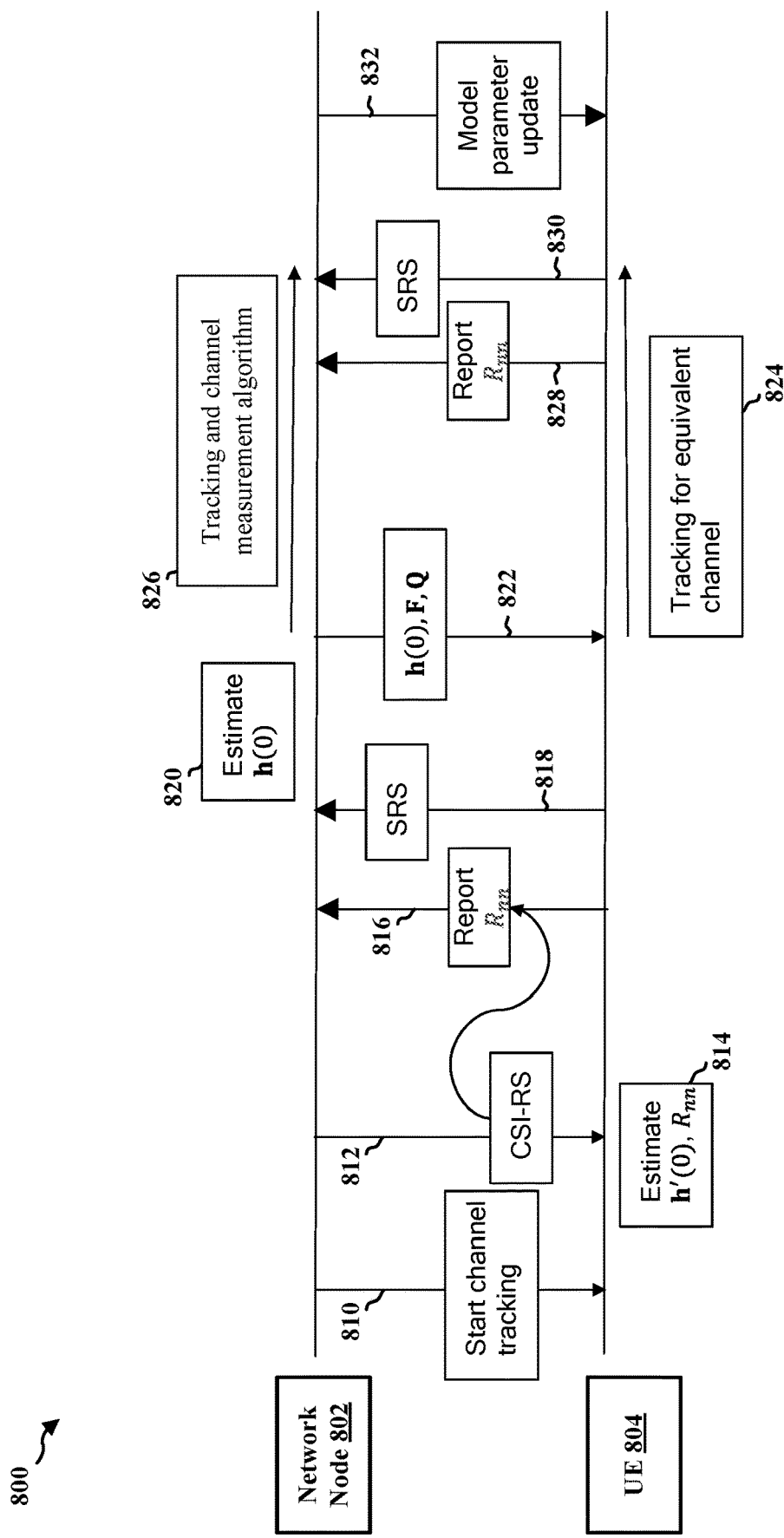
FIG. 8 is a call flow diagram illustrating a model-based channel tracking technique, in accordance with various aspects of the present disclosure.

FIG. 8 illustrates an example communication flow 800 between a UE 804 and a network node 802 in which the UE 804 may transmit an initial SRS (e.g., an SRS 818) that may correspond to the SRS 716 in FIG. 7 and transmits one or more additional SRS 830, which may correspond to the SRS transmissions 722 in FIG. 7. FIG. 8 illustrates additional aspects that may avoid the network node 802 using an $R_{nn}$ that is out-of-date, e.g., no longer accurate. In FIG. 8, the network node 802 may configure channel model parameter for each SRS resource or each SRS resource set in order to enable channel tracking at both the network side and the UE side, e.g., per Tx-Rx beam pair.

At 810, the network node 802 may indicate for the UE to start channel tracking, e.g., which may include one or more aspect described in connection with the channel tracking initiation communication 410 in FIG. 4. The network node 802 may transmit a CSI-RS 812, or another CMR or IMR, that the UE 804 measures to estimate the channel, e.g., at h'(0) and the $R_{nn}$, at 814. The UE reports the $R_{nn}$ to the network node 802 at 816 and transmits an unprecoded SRS (e.g., the SRS 818). The network node 802 estimates the channel h(0) based on the non-precoded SRS and the $R_{nn}$ from the UE, at 820. The network node may then track the channel and/or perform channel measurements based on the channel model and the initial estimation of the channel h(0). As illustrated at 822, the network node 802 may provide information about the channel model, such as h(0), F, and Q, to the UE 804 at 822. The information may include any of the aspects described in connection with the channel model configuration 420 of FIG. 4 and/or the channel model configuration 510 of FIG. 5. In order to help the network node 802 have current $R_{nn}$, the UE may track the channel, as illustrated at 824, using the channel model and the information received at 822. For example, the UE may track variations in a channel relative to a model condition based on the channel model. The UE may report an updated $R_{nn}$ 828 along with each SRS transmission of the one or more additional SRS 830. In some aspects, the network node 802 may provide a soft indication to UE that the BS is going to do channel tracking. The network node 802 may configure the UE 804 to estimate the channel h'(0) and/or to estimate the $R_{nn}$. The network node 802 may configure the UE 804 to feedback the $R_{nn}$ metric to the network.

The configuration to provide the $R_{nn}$ to the network may indicate for the UE 804 to inform the network of a change in the $R_{nn}$. In some aspects, a change in the $R_{nn}$ may trigger the UE 804 to provide the $R_{nn}$ to the network. In some aspects, the network may configure the UE 804 to provide fixed or dynamic $R_{nn}$ reports. The UE may be configured to provide the $R_{nn}$ before each SRS transmission.

If the $R_{nn}$ and/or the measurement of the one or more additional SRS 830 leads the network node 802 to change or update model parameters for the channel model used in the tracking, at 826, the network node 802 may provide the updated model parameters to the UE 804 via a model parameter update 832. For example, the network node may track variations in a channel relative to a model condition based on the channel model. In some aspects, the network node 802 may provide the updated model parameters in response to the change being equal to or more than a threshold level of change. In some aspects, the one or more additional SRS 830 may be associated with the updated $R_{nn}$ 828 so that the network node 802 knows to use the updated $R_{nn}$ 828 with the one or more additional SRS 830.

Figure 9:
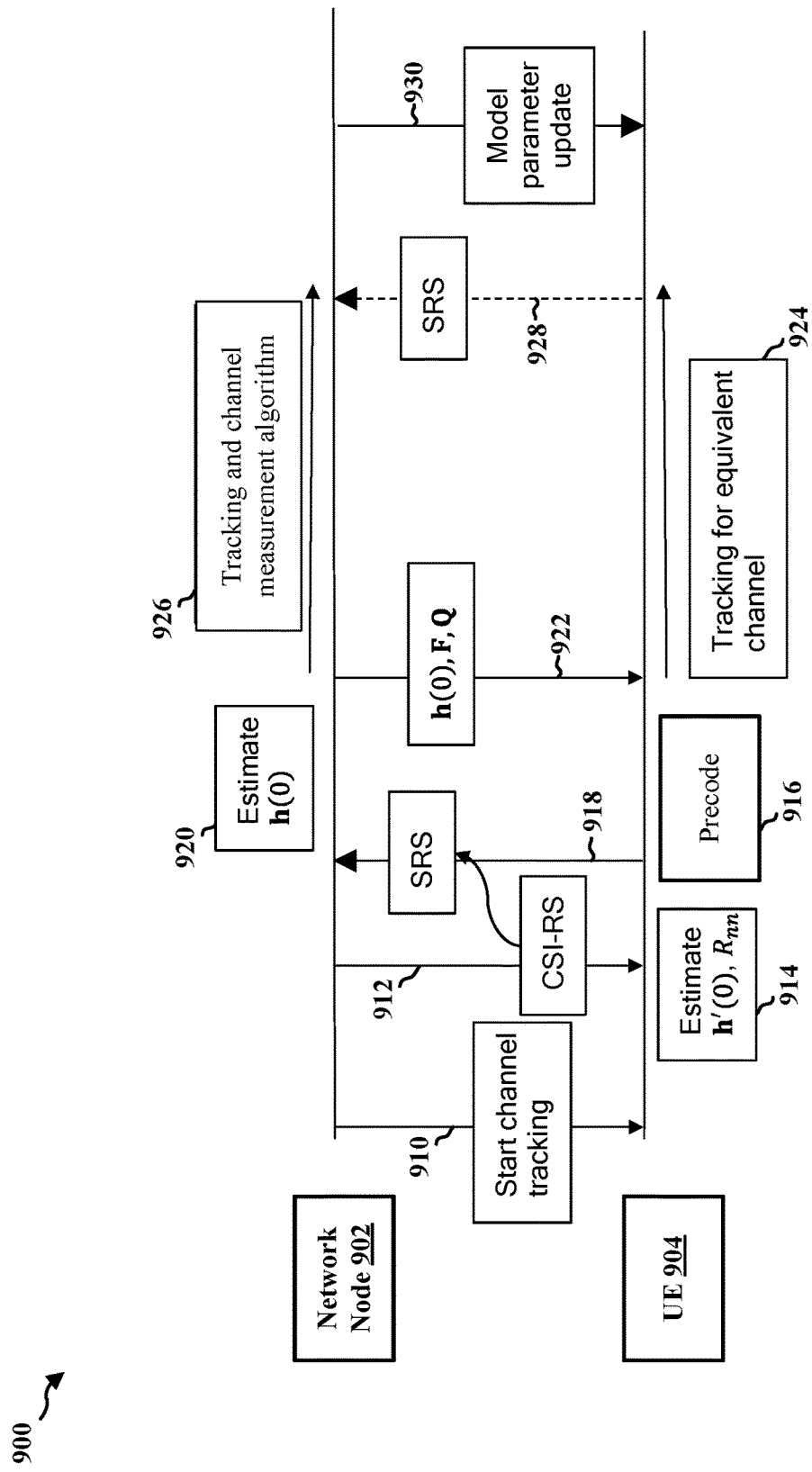
FIG. 9 is a call flow diagram illustrating a model-based channel tracking technique, in accordance with various aspects of the present disclosure.

FIG. 9 illustrates an example communication flow 900 between a network node 902 and a UE 904 similar to the communication flows in FIGS. 6-8. In the example of FIG. 9, the UE 904 precodes the initial SRS transmission (e.g., an SRS 918), as shown at 916. At 910, the network node 902 may indicate for the UE 904 to start channel tracking, e.g., which may include one or more aspect described in connection with the channel tracking initiation communication 410 in FIG. 4 or at 810 in FIG. 8. The network node 902 may transmit a CSI-RS 912, or another CMR or IMR, that the UE 804 measures to estimate the channel, e.g., h'(0), at 914. The UE may then precode the SRS 918 based on the $R_{nn}$, at 916.

The UE may precode the SRS 918 based on $R_{nn}^{-1/2}$ so that the network may estimate the equivalent channel ($H^T R_{nn}^{-1/2}$). The network node 902 may then estimate the channel h(0) based on the SRS 918 from the UE 904. The network node 902 may then track the channel and/or perform channel measurements, at 926, based on the channel model and the initial estimation of the channel h(0), at 920. For example, the network node 902 may track variations in a channel relative to a model condition based on the channel model. As illustrated at 922, the network node 902 may provide information about the channel model, such as h(0), F, and Q, to the UE 904. The information may include any of the aspects described in connection with the channel model configuration 420 of FIG. 4 and/or the channel model configuration 510 of FIG. 5. In order to help the network node 802 have current information about the channel, the UE 904 may transmit subsequent SRS (e.g., an SRS 928) that are precoded using the estimated/tracked channel, e.g., H, information. For example, the UE may track the channel, as illustrated at 924, using the channel model and the information received at 922 and may precode the SRS 928 based on the tracked channel. For example, the UE may track variations in a channel relative to a model condition based on the channel model. As illustrated at 930, the network node 902 may provide the UE 904 with a model parameter update if the network node 902 determines to update the model based on the SRS received from the UE.

In some aspects, the UE may precode the SRS based on an $R_{nn}$ each time the UE estimates the $R_{nn}$. The aspects of FIG. 9 may enable the UE to provide the $R_{nn}$ information to the network through a precoded SRS rather than signaling feedback including an indication of the $R_{nn}$. Instead, the SRS 928 may be precoded based on the $R_{nn}$ that is derived from the CSI-RS 912. The UE receives the CSI-RS 912 and suggests a PMI to the network node 902. The covariance is factored in to the measurement (e.g., when selecting the PMI) and may be equivalent to a whitened channel for which the UE is reporting back the PMI. Due to reciprocity, the channel observed by the UE that is the source of the precoding for the SRS 928 is the transpose of the channel that the network node 902 is tracking.

Figure 10:
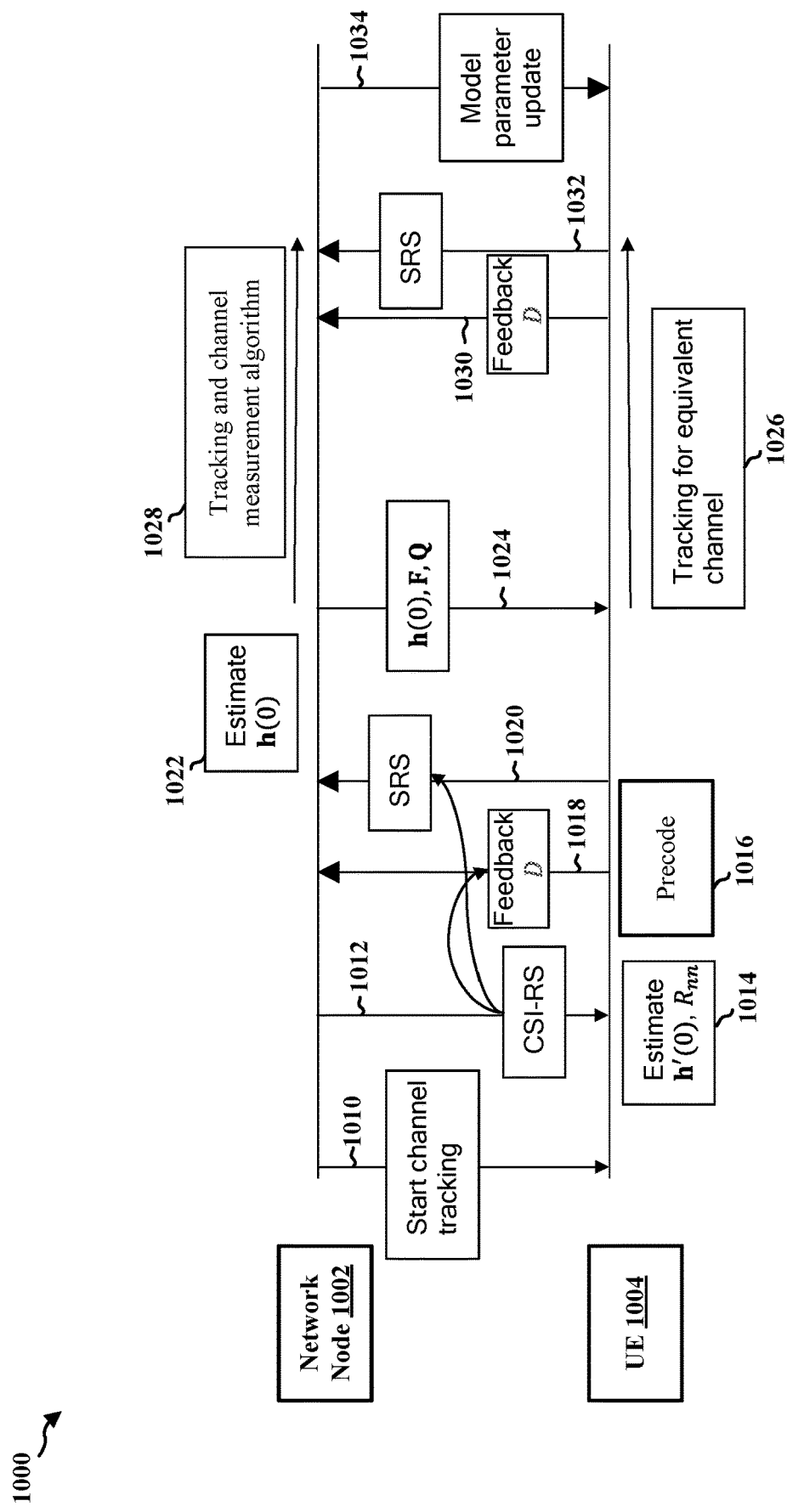
FIG. 10 is a call flow diagram illustrating a model-based channel tracking technique, in accordance with various aspects of the present disclosure.

FIG. 10 illustrates an example communication flow 1000 between a UE 1004 and a network node 1002 in which the UE precodes an SRS based on a normalized and/or scaled noise covariance. At 1010, the network node 1002 may indicate for the UE 1004 to start channel tracking, e.g., which may include one or more aspect described in connection with the channel tracking initiation communication 410 in FIG. 4, at 810 in FIG. 8, and/or at 910 in FIG. 9. The network node 1002 may transmit a CSI-RS 1012, or another CMR or IMR, that the UE 1004 measures to estimate the channel, e.g., at h'(0), and noise at 1014. The UE may then precode an SRS 1020 based on the $R_{nn}$, at 1016. Where the SRS 918 in FIG. 9 may be precoded based on $R_{nn}^{-1/2}$, in FIG. in some aspects, the precoding may not satisfy uplink transmission power constraints and may cause PAPR issues. In FIG. 10, instead of precoding with $R_{nn}^{-1/2}$, the UE 1004 may use a normalized version of $$\check{R}_{nn}^{-\frac{1}{2}},$$

which may be referred to as $\check{R}_{nn}^{-1/2}$ e.g., such that $$R_{nn}^{-\frac{1}{2}} = \check{R}_{nn}^{-1/2}$$

D where D is a diagonal and contains scaling factors. In some aspects, advanced precoding for UL may not be supported because of power constraints in the uplink. For example, there may be limits on power that can be allocated because of a precoder on the UE-side through an antenna port on the uplink. Precoding with a "random" factor could violate power constraints and/or cause PAPR issues, and may create an imbalance on the transmission node in the uplink. In order to avoid such challenges, the UE may normalize $$\check{R}_{nn}^{-\frac{1}{2}}$$

and transmit the normalized $\check{R}_{nn}^{-1/2}$. For example, each column of $$\check{R}_{nn}^{-\frac{1}{2}}$$

may be normalized using a diagonal entry of D, and the UE may use the normalized $\check{R}_{nn}^{-1/2}$, which relates to the actual covariance matrix $R_{nn}$ through a diagonal matrix multiplication with matrix D that contains scaling factors so that, per transmission port, the power constraint is satisfied. The UE may provide, or otherwise indicate, the scaling factor D to the network node, e.g., at 1018, so that the network node 1002 can know the manner in which $R_{nn}$ was normalized. The base station can then receive the precoded SRS (e.g., the SRS 1020) and use the corresponding scaling factors to obtain the effective channel experienced by the UE 1004.

Using a matrix based on the normalized and/or scaled noise covariance may help to ensure that the total power transmitted for a particular transmission port corresponds to a fixed value. As $R_{nn}$ is obtained through a measurement, it may potentially have any value. The scaling with the diagonal D involves each column of $R_{nn}$ being multiplied for a transmission by a respective transmission port. Normalizing enables the range of values of the individual entries in the post-multiplication vector to be controlled based on the multiplication by the matrix D. Each vector entry of each column of the matrix may adhere to a per transmission port power constraint or a peak-to-average-power-ratio (PAPR) of the signals or of an uplink transmission scheme. The normalization factor scales each column of the original matrix $R_{nn}$, and can be represented as the multiplication of two matrices, where the second matrix is actually a diagonal matrix (or could be represented as a vector). The network node may use the SRS 1020 to obtain an initial estimate of the channel, e.g., h(0). The network node 1002 and/or the UE 1004 may then perform channel tracking as described in connection with any of FIGS. 4-9. In the example illustrated in FIG. 10, the network node may then track the channel and/or perform channel measurements, at 1028, based on the channel model and the initial estimation of the channel h(0). For example, the network node may track variations in a channel relative to a model condition based on the channel model. As illustrated at 1024, the network node 1002 may provide information about the channel model, such as h(0), F, and Q, to the UE 1004. The information may include any of the aspects described in connection with the channel model configuration 420 of FIG. 4 and/or the channel model configuration 510 of FIG. 5. In order to help the network node 1002 have current information about the channel, the UE 1004 may transmit subsequent SRS 1032 that are precoded using the estimated/tracked channel, e.g., H, and noise information. For example, the UE 1004 may track the channel, as illustrated at 1026, using the channel model and the information received at 1022 and may precode the SRS 1032 based on the tracked channel. The SRS may be precoded based on normalized noise covariance information, e.g., $\check{R}_{nn}^{-1/2}$, such as for SRS 1020. The UE may indicate the diagonal D 1030, as well. For example, the UE may track variations in a channel relative to a model condition based on the channel model. As illustrated at 1034, the network node 1002 may provide the UE 1004 with a model parameter update if the network node 1002 determines to update the model based on the SRS received from the UE.

Figure 11:
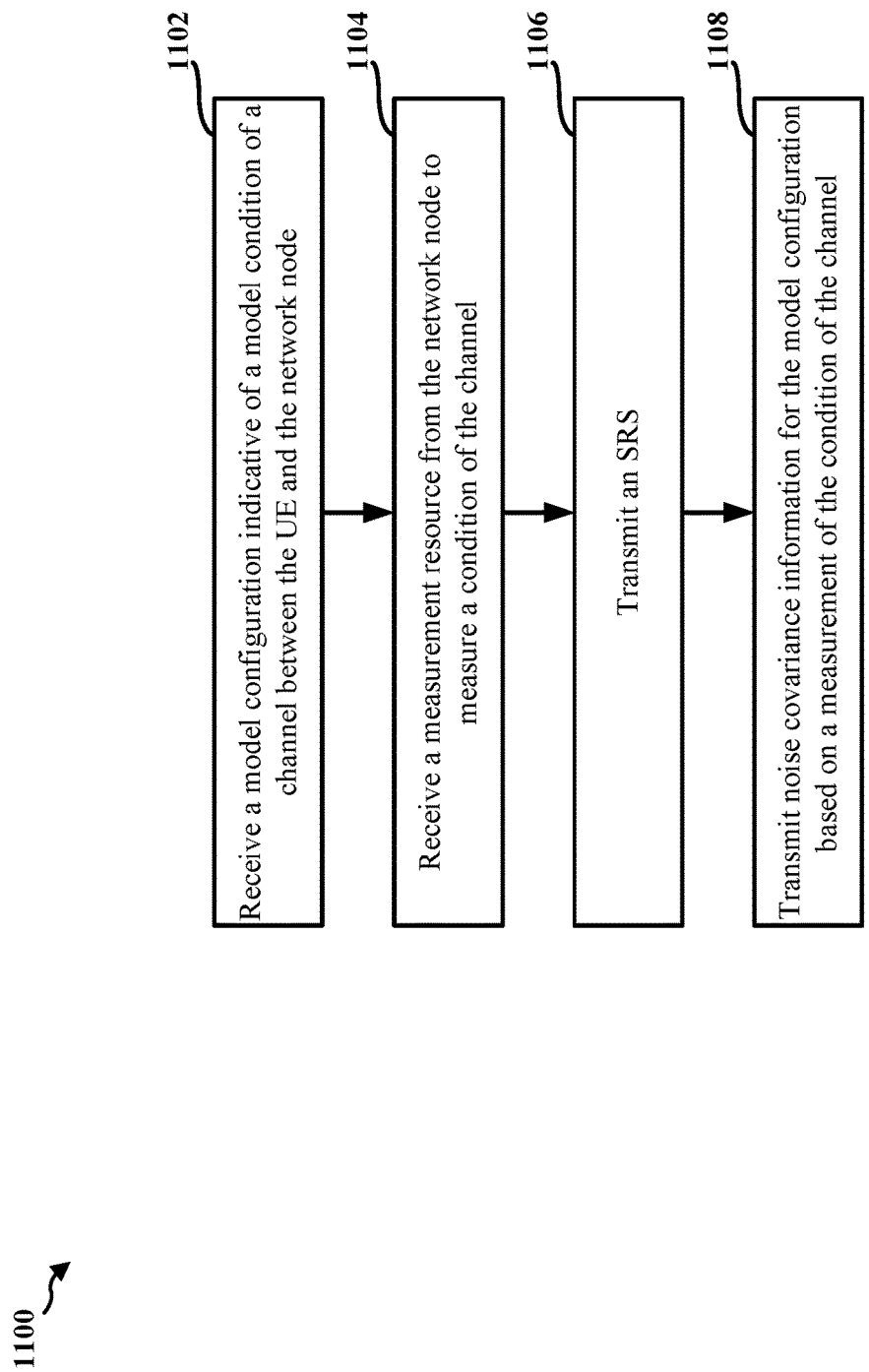
FIG. 11 is a flowchart of a method of wireless communication at a UE, in accordance with the teachings disclosed herein.

FIG. 11 is a flowchart 1100 of a method of wireless communication. The method may be performed by a UE (e.g., the UE 104, 350, 404, 504, 604, 704, 804, 904, 1004, and/or an apparatus 1304 of FIG. 13). Aspects of the method of the flowchart 1100 may be performed by a cellular RF transceiver 1322 and/or the channel feedback component 198 of the apparatus 1304 of FIG. 13. The method may facilitate improving channel tracking and reducing signaling overhead.

At 1102, the UE receives, from a network node, a model configuration indicative of a model condition of a channel between the UE and the network node. Various aspects of receiving a model configuration are described in connection FIGS. 4-10. The reception may be performed, e.g., by the channel feedback component 198 of the apparatus 1302.

At 1104, the UE receives a measurement resource from the network node to measure a condition of the channel. The reception may be performed, e.g., by the channel feedback component 198 of the apparatus 1302. FIGS. 4, 5, 7, 8, and 9 illustrate examples of a UE receiving measurement resource, e.g., the channel measurement resource 412, the channel measurement resource 514, the CSI-RS 710, the CSI-RS 812, the CSI-RS 912, the CSI-RS 1012. Among other examples, the measurement resource may include a CMR, IMR, and/or CSI-RS.

At 1106, the UE transmits, to the network node, an SRS. The transmission may be performed, e.g., by the channel feedback component 198 of the apparatus 1302. FIGS. 5-10 illustrate examples of a UE transmitting an SRS.

At 1108, the UE transmits, to the network node, noise covariance information for the model configuration based on a measurement of the condition of the channel, the noise covariance information associated with the SRS. The transmission may be performed, e.g., by the channel feedback component 198 of the apparatus 1302. FIGS. 5 and 7-10 illustrate various aspects of a UE transmitting noise covariance information.

Figure 12:
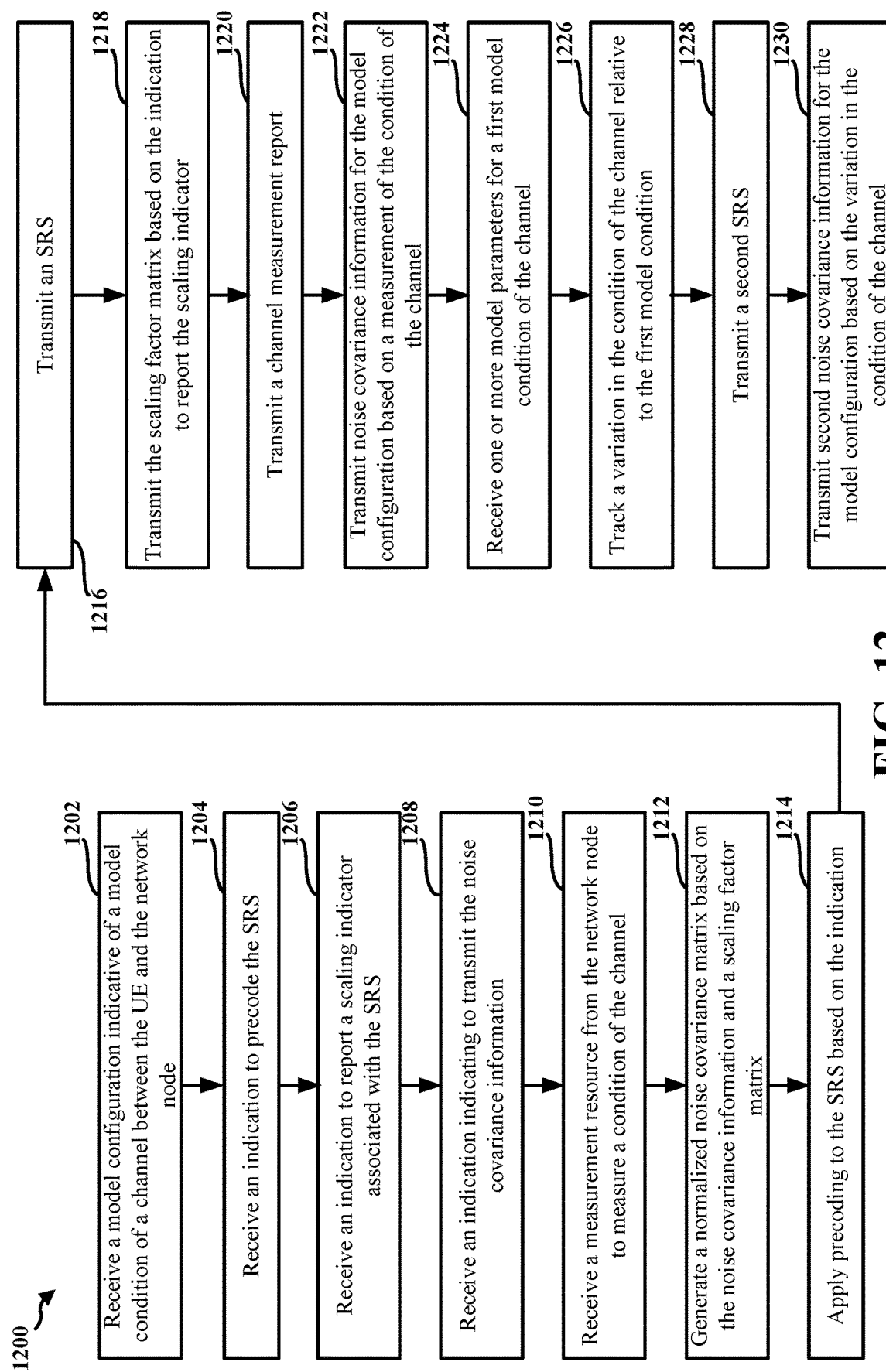
FIG. 12 is a flowchart of a method of wireless communication at a UE, in accordance with the teachings disclosed herein.

FIG. 12 is a flowchart 1200 of a method of wireless communication. The method may be performed by a UE (e.g., the UE 104, 350, 404, 504, 604, 704, 804, 904, 1004, and/or an apparatus 1304 of FIG. 13). Aspects of the method of the flowchart 1400 may be performed by a cellular RF transceiver 1322 and/or the channel feedback component 198 of the apparatus 1304 of FIG. 13. The method may facilitate improving channel tracking and reducing signaling overhead.

At 1202, the UE receives, from a network node, a model configuration indicative of a model condition of a channel between the UE and the network node. Various aspects of receiving a model configuration are described in connection FIGS. 4-10. The reception may be performed, e.g., by the channel feedback component 198 of the apparatus 1302.

At 1210, the UE receives a measurement resource from the network node to measure a condition of the channel. The reception may be performed, e.g., by the channel feedback component 198 of the apparatus 1302. FIGS. 4, 5, 7, 8, and 9 illustrate examples of a UE receiving measurement resource, e.g., the channel measurement resource 412, the channel measurement resource 514, the CSI-RS 710, the CSI-RS 812, the CSI-RS 912, the CSI-RS 1012. Among other examples, the measurement resource may include a CMR, IMR, and/or CSI-RS.

At 1216, the UE transmits, to the network node, an SRS. The transmission may be performed, e.g., by the channel feedback component 198 of the apparatus 1302. FIGS. 5-10 illustrate examples of a UE transmitting an SRS.

At 1222, the UE transmits, to the network node, noise covariance information for the model configuration based on a measurement of the condition of the channel, the noise covariance information associated with the SRS. The transmission may be performed, e.g., by the channel feedback component 198 of the apparatus 1302. FIGS. 5 and 7-10 illustrate various aspects of a UE transmitting noise covariance information.

As an example, at 1220, the UE may transmit a channel measurement report, the channel measurement report, such as a CSI report, including the noise covariance information. As an example, FIG. 8 illustrates the network node 802 receiving the $R_{nn}$ from the UE 804. The initial SRS may include a non-precoded SRS, e.g., as described in connection with the SRS 818 of FIG. 8. The transmission may be performed, e.g., by the channel feedback component 198 of the apparatus 1302.

In some aspects, as illustrated at 1208, the UE may receive an indication indicating to transmit the noise covariance information. FIGS. 7 and 8 illustrate examples at 714 and at 816, respectively. In some aspects, the model configuration may include the indication. The reception may be performed, e.g., by the channel feedback component 198 of the apparatus 1302.

At 1224, the UE may receive one or more model parameters for a first model condition of the channel, the one or more model parameters based in part on the SRS and the noise covariance information. The reception may be performed, e.g., by the channel feedback component 198 of the apparatus 1302. For example, the UE may receive information indicating h(0), F, and/or Q, such as described in connection with any of FIG. 4, 5, or 8-10.

At 1226, the UE may track a variation in the condition of the channel relative to the first model condition. The tracking may be performed, e.g., by the channel feedback component 198 of the apparatus 1302. Example aspects of tracking are described in connection with any of FIG. 4, 5, 6, or 8-10.

At 1228, the UE may transmit a second SRS. The transmission may be performed, e.g., by the channel feedback component 198 of the apparatus 1302. FIG. 8 illustrates the transmission of the one or more additional SRS 830, as an example. At 1230, the UE may transmit a second noise covariance information for the model configuration based on the variation in the condition of the channel. The transmission may be performed, e.g., by the channel feedback component 198 of the apparatus 1302. An example of a UE transmitting second noise covariance information, e.g., the updated $R_{nn}$ 828, is described in connection with FIG. 8.

At 1204, the UE may receive an indication to precode the SRS. The reception may be performed, e.g., by the channel feedback component 198 of the apparatus 1302. In some aspects, the model configuration may include the indication to precode the SRS.

At 1214, the UE may apply precoding to the SRS based on the indication, wherein the SRS is precoded using the noise covariance information. The application may be performed, e.g., by the channel feedback component 198 of the apparatus 1302. FIGS. 9 and 10 illustrate example aspects of a UE precoding an SRS. In some aspects, the model configuration may include the indication to precode the SRS.

At 1202, the UE may receive one or more model parameters for a first model condition of the channel, the one or more model parameters based in part on the SRS being precoded using the noise covariance information. The reception may be performed, e.g., by the channel feedback component 198 of the apparatus 1302. FIGS. 8-10 illustrate various examples of a UE receiving model parameters, e.g., at 822, at 922, at 1024.

At 1226, the UE may track a variation in the condition of the channel relative to the first model condition. The tracking may be performed, e.g., by the channel feedback component 198 of the apparatus 1302. Example aspects of tracking are described in connection with any of FIG. 4, 5, 6, or 8-10.

At 1228, the UE may transmit a second SRS precoded using second noise covariance information for the model configuration, the second noise covariance information based on the variation in the condition of the channel. The transmission may be performed, e.g., by the channel feedback component 198 of the apparatus 1302. An example of transmission of a second precoded SRS is illustrated in FIG. 9.

At 1204, the UE may receive a first indication to precode the SRS. The reception may be performed, e.g., by the channel feedback component 198 of the apparatus 1302. Example aspects of precoding SRS are described in connection with FIG. 9 and/or FIG. 10.

At 1206, the UE may receive a second indication to report a scaling indicator associated with the SRS. The reception may be performed, e.g., by the channel feedback component 198 of the apparatus 1302.

At 1212, the UE may generate a normalized noise covariance matrix based on the noise covariance information and a scaling factor matrix. The scaling factor matrix may include a diagonal matrix. Each column of the normalized noise covariance matrix may correspond to a respective transmit power, and the respective transmit power or the uplink transmit strategy satisfies a per-transmit port power constraint of the UE. Example aspects of scaling are described in connection with FIG. 10.

At 1214, the UE may apply precoding to the SRS based on the first indication, wherein the SRS is precoded using the normalized noise covariance matrix. The model configuration may include the first indication to precode the SRS and the second indication to report the scaling indicator. The application may be performed, e.g., by the channel feedback component 198 of the apparatus 1302.

At 1218, the UE may transmit the scaling factor matrix based on the second indication to report the scaling indicator. The model configuration may include the first indication to report the scaling indicator. The transmission may be performed, e.g., by the channel feedback component 198 of the apparatus 1302.

Figure 13:
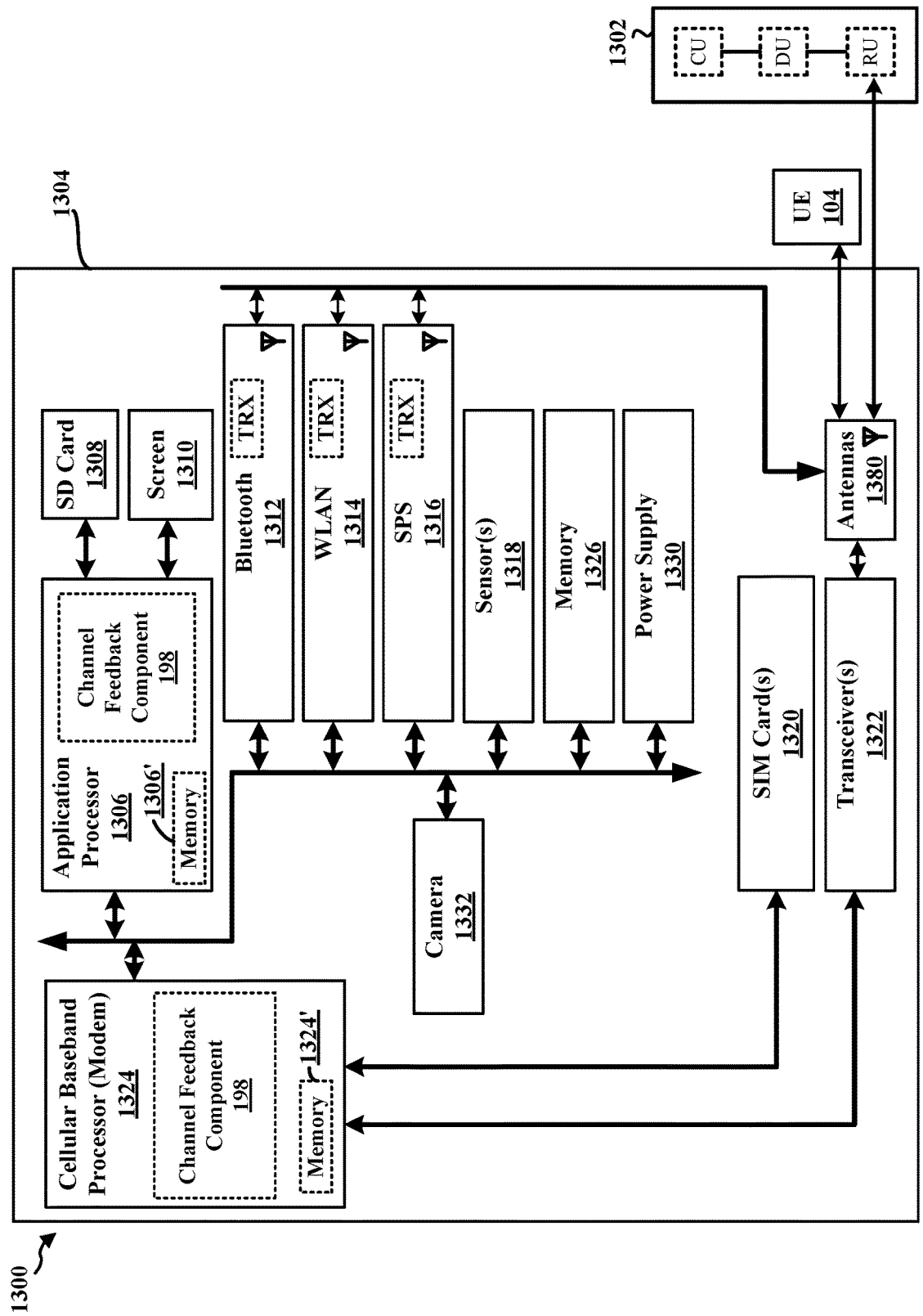
FIG. 13 is a diagram illustrating an example of a hardware implementation for an example apparatus and/or a UE.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers (e.g., a cellular RF transceiver 1322). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize one or more antennas 1380 for communication. The cellular baseband processor 1324 communicates through transceiver(s) (e.g., the cellular RF transceiver 1322) via one or more antennas 1380 with the UE 104 and/or with an RU associated with an apparatus 1302. The cellular baseband processor 1324 and the application processor 1306 may each include a computer-readable medium/memory, such as the on-chip memory 1324', and the on-chip memory 1306', respectively. The additional memory modules 1326 may also be considered a computer-readable medium/memory. Each computer-readable medium/memory (e.g., the on-chip memory 1324', the on-chip memory 1306', and/or the additional memory modules 1326) may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see the UE 350 of FIG. 3) and include the additional modules of the apparatus 1304.

As discussed supra, the channel feedback component 198 is configured to receive, from a network node, a model configuration indicative of a model condition of a channel between the UE and the network node; receive a measurement resource from the network node to measure a condition of the channel; transmit, to the network node, an SRS; and transmit, to the network node, noise covariance information for the model configuration based on a measurement of the condition of the channel, the noise covariance information associated with the SRS.

The channel feedback component 198 may be within the cellular baseband processor 1324, the application processor 1306, or both the cellular baseband processor 1324 and the application processor 1306. The channel feedback component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1304 may include a variety of components configured for various functions. For example, the channel feedback component 198 may include one or more hardware components that perform each of the blocks of the algorithm in the flowcharts of FIGS. 11 and/or 14.

In one configuration, the apparatus 1304, and in particular the cellular baseband processor 1324 and/or the application processor 1306, includes means for performing any of the aspects of the methods of FIGS. 11 and/or 14.

The means may be the channel feedback component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
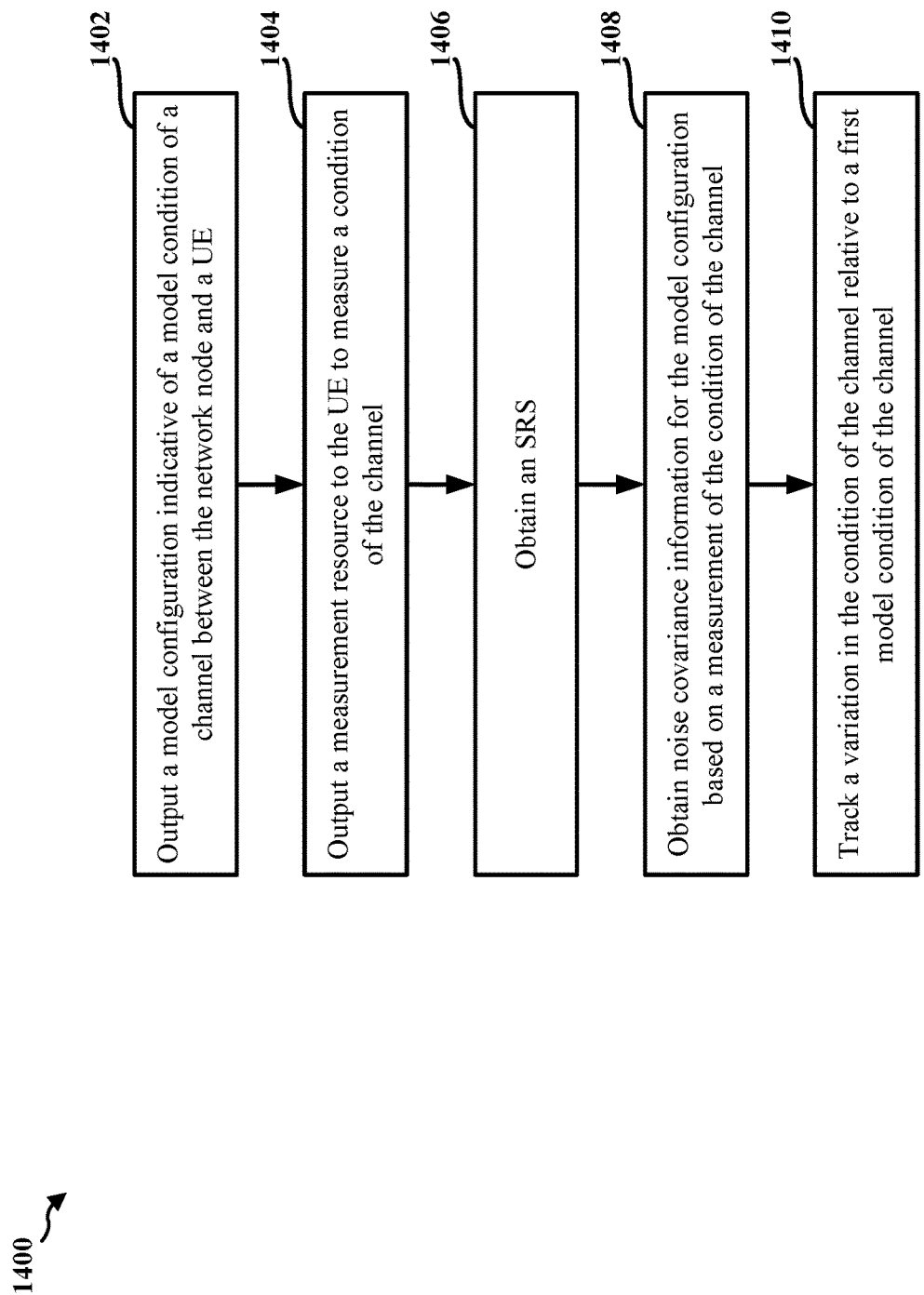
FIG. 14 is a flowchart of a method of wireless communication at a network entity, in accordance with the teachings disclosed herein.

FIG. 14 is a flowchart 1400 of a method of wireless communication. The method may be performed by a network node (e.g., the base station 102, 310; network node 402, 502, 602, 702, 802, 902, 1002; and/or an apparatus 1602 of FIG. 16). The method may facilitate improving channel tracking and reducing signaling overhead.

At 1402, the network node outputs a model configuration indicative of a model condition of a channel between the network node and a UE. For example, the network node may transmit the model configuration to the UE. Various aspects of providing a model configuration are described in connection FIGS. 4-10. The output may be performed, e.g., by the channel tracking component 199 of the apparatus 1602.

At 1404, the network node outputs a measurement resource to the UE to measure a condition of the channel. For example, the network node may transmit the measurement resource. The output may be performed, e.g., by the channel tracking component 199 of the apparatus 1602. FIGS. 4, 5, 7, 8, and 9 illustrate examples of the network node transmitting measurement resource, e.g., the channel measurement resource 412, the channel measurement resource 514, the CSI-RS 710, the CSI-RS 812, the CSI-RS 912, the CSI-RS 1012. Among other examples, the measurement resource may include a CMR, IMR, and/or CSI-RS.

At 1406, the network node obtains an SRS. For example, the network node may receive the SRS from the UE. The obtaining may be performed, e.g., by the channel tracking component 199 of the apparatus 1602. FIGS. 5-10 illustrate examples of a network node receiving an SRS.

At 1408, the network node obtains noise covariance information for the model configuration based on a measurement of the condition of the channel, the noise covariance information associated with the SRS. For example, the network node may receive the noise covariance information from the UE, the noise covariance information being based on a UE measurement of the condition of the channel. The obtaining may be performed, e.g., by the channel tracking component 199 of the apparatus 1602. FIGS. 5 and 7-10 illustrate various aspects of a network node receiving noise covariance information.

At 1410, the network node tracks a variation in the condition of the channel relative to a first model condition of the channel, the first model condition being based on the SRS and the noise covariance information. The tracking may be performed, e.g., by the channel tracking component 199 of the apparatus 1602. FIGS. 5 and 7-10 illustrate various aspects of a network node tracking a variation in a channel condition of a channel relative to a model condition based in part on noise covariance information.

Figure 15:
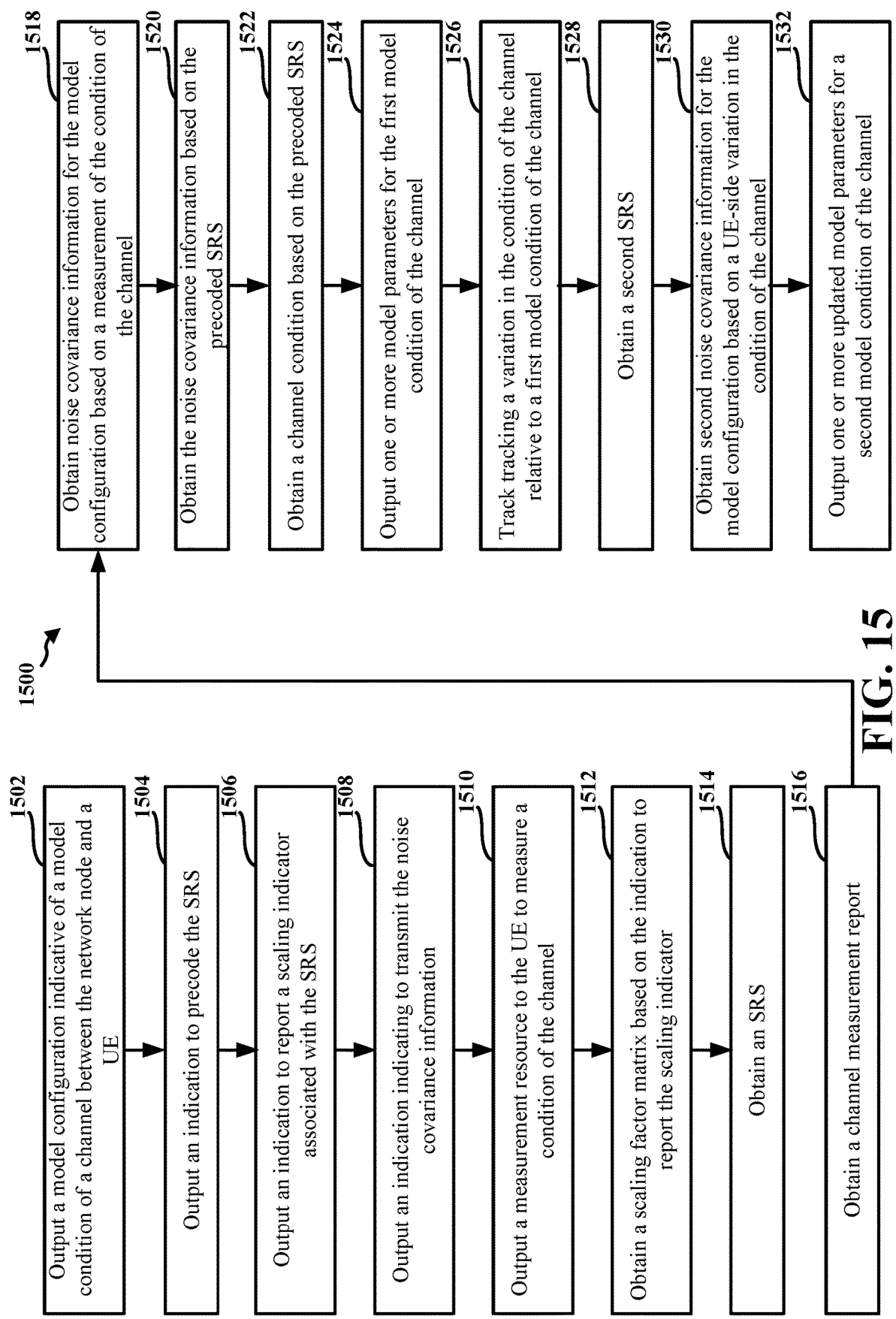
FIG. 15 is a flowchart of a method of wireless communication at a network entity, in accordance with the teachings disclosed herein.

FIG. 15 is a flowchart 1500 of a method of wireless communication. The method may be performed by a network node (e.g., the base station 102, 310; network node 402, 502, 602, 702, 802, 902, 1002; and/or an apparatus 1602 or network entity of FIG. 16). The method may facilitate improving channel tracking and reducing signaling overhead.

At 1502, the network node outputs a model configuration indicative of a model condition of a channel between the network node and a UE. For example, the network node may transmit the model configuration to the UE. Various aspects of providing a model configuration are described in connection FIGS. 4-10. The output may be performed, e.g., by the channel tracking component 199 of the apparatus 1602.

At 1510, the network node outputs a measurement resource to the UE to measure a condition of the channel. For example, the network node may transmit the measurement resource. The output may be performed, e.g., by the channel tracking component 199 of the apparatus 1602. FIGS. 4, 5, 7, 8, and 9 illustrate examples of the network node transmitting measurement resource, e.g., the channel measurement resource 412, the channel measurement resource 514, the CSI-RS 710, the CSI-RS 812, the CSI-RS 912, the CSI-RS 1012. Among other examples, the measurement resource may include a CMR, IMR, and/or CSI-RS.

At 1514, the network node obtains an SRS. For example, the network node may receive the SRS from the UE. The obtaining may be performed, e.g., by the channel tracking component 199 of the apparatus 1602. FIGS. 5-10 illustrate examples of a network node receiving an SRS.

At 1518, the network node obtains noise covariance information for the model configuration based on a measurement of the condition of the channel, the noise covariance information associated with the SRS. For example, the network node may receive the noise covariance information from the UE, the noise covariance information being based on a UE measurement of the condition of the channel. The obtaining may be performed, e.g., by the channel tracking component 199 of the apparatus 1602. FIGS. 5 and 7-10 illustrate various aspects of a network node receiving noise covariance information.

At 1526, the network node tracks a variation in the condition of the channel relative to a first model condition of the channel, the first model condition being based on the SRS and the noise covariance information. The tracking may be performed, e.g., by the channel tracking component 199 of the apparatus 1602. FIGS. 5 and 7-10 illustrate various aspects of a network node tracking a variation in a channel condition of a channel relative to a model condition based in part on noise covariance information.

As illustrated at 1516, the network node may obtain a channel measurement report, the channel measurement report including the noise covariance information. The obtaining may be performed, e.g., by the channel tracking component 199 of the apparatus 1602. As an example, FIG. 8 illustrates the network node 802 receiving the $R_{nn}$ from the UE. The SRS transmitted may include a non-precoded SRS, e.g., as described in connection with the SRS 818 of FIG. 8.

In some aspects, the network node may output an indication indicating to transmit the noise covariance information, at 1508. The indication may trigger the UE to provide the noise covariance information. The output may be performed, e.g., by the channel tracking component 199 of the apparatus 1602. In some aspects, the model configuration may include the indication. FIGS. 7 and 8 illustrate examples at 714 and at 816, respectively.

As illustrated at 1524, the network node may output one or more model parameters for the first model condition of the channel. The output may be performed, e.g., by the channel tracking component 199 of the apparatus 1602. FIG. 8 illustrates an example, at 822. Example aspects of tracking are described in connection with any of FIG. 4, 5, 6, or 8-10.

As illustrated at 1528, the network node may obtain a second SRS. The obtaining may be performed, e.g., by the channel tracking component 199 of the apparatus 1602. FIG. 8 illustrates the reception of the one or more additional SRS 830, as an example.

As illustrated at 1530, the network node may obtain second noise covariance information for the model configuration based on a UE-side variation in the condition of the channel, the second noise covariance information being associated with the second SRS. The obtaining may be performed, e.g., by the channel tracking component 199 of the apparatus 1602. An example of a network node receiving second noise covariance information, e.g., the updated $R_{nn}$ 828, is described in connection with FIG. 8.

As illustrated at 1532, the network node may output one or more updated model parameters for a second model condition of the channel, the second model condition being based in part on the second SRS and the second noise covariance information. The output may be performed, e.g., by the channel tracking component 199 of the apparatus 1602. An example of a model parameter update 832 is described in connection with FIG. 8.

As illustrated at 1504, the network node may output an indication to precode the SRS, wherein the SRS includes a precoded SRS. The output may be performed, e.g., by the channel tracking component 199 of the apparatus 1602. In some aspects, the model configuration may include the indication to precode the SRS.

As illustrated at 1520, the network node may obtain the noise covariance information based on the precoded SRS. The obtaining may be performed, e.g., by the channel tracking component 199 of the apparatus 1602. Example aspects of a network obtaining noise covariance information from a precoded SRS are described in connection with FIG. 9 and FIG. 10.

As illustrated at 1522, the network node may obtain a channel condition based on the precoded SRS. The obtaining may be performed, e.g., by the channel tracking component 199 of the apparatus 1602. Example aspects of obtaining a channel condition based on the precoded SRS is described in connection with FIG. 9 and FIG. 10.

As illustrated at 1524, the network node may output one or more model parameters for the first model condition of the channel, the one or more model parameters based in part on the channel condition and the noise covariance information. The output may be performed, e.g., by the channel tracking component 199 of the apparatus 1602. FIGS. 8-10 illustrate various examples of a network node providing model parameters, e.g., at 822, at 922, at 1024.

At 1528, the network node may obtain a second precoded SRS. The obtaining may be performed, e.g., by the channel tracking component 199 of the apparatus 1602. An example of reception of a second precoded SRS is illustrated in FIG. 9.

At 1532, the network node may output one or more updated model parameters for a second model condition of the channel, the second model condition based in part on a second channel condition and second noise covariance information, the second channel condition and the second noise covariance information both obtained from the second precoded SRS. The output may be performed, e.g., by the channel tracking component 199 of the apparatus 1602. An example of a model parameter update is described in connection with 930 at FIG. 9.

In some aspects, at 1504, the network node may output a first indication to precode the SRS, wherein the SRS includes a precoded SRS. The output may be performed, e.g., by the channel tracking component 199 of the apparatus 1602. The model configuration may include the first indication to precode the SRS and the second indication to report the scaling indicator.

At 1506, the network node may output a second indication to report a scaling indicator associated with the SRS. The output may be performed, e.g., by the channel tracking component 199 of the apparatus 1602. Example aspects of a scaling indicator are described in connection with FIG. 10.

At 1512, the network node may obtain a scaling factor matrix based on the second indication to report the scaling indicator. The scaling factor matrix may include a diagonal matrix. The obtaining may be performed, e.g., by the channel tracking component 199 of the apparatus 1602.

At 1520, the network node may obtain a channel condition and the noise covariance information based on the precoded SRS. The obtaining may be performed, e.g., by the channel tracking component 199 of the apparatus 1602.

At 1524, the network node outputs one or more model parameters for the first model condition of the channel, the one or more model parameters based in part on the channel condition and the noise covariance information. The output may be performed, e.g., by the channel tracking component 199 of the apparatus 1602.

Figure 16:
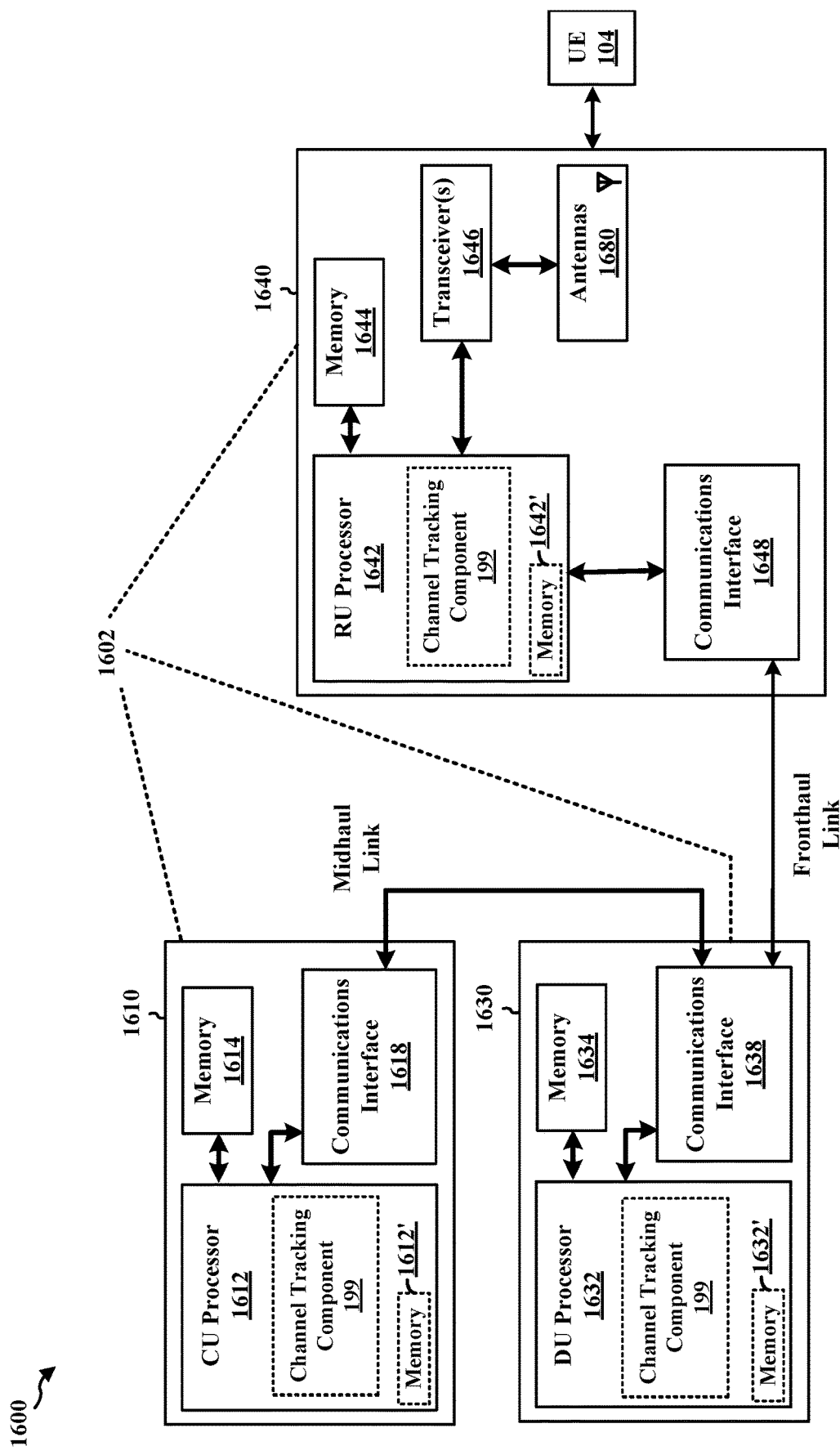
FIG. 16 is a diagram illustrating an example of a hardware implementation for an example network entity.

FIG. 16 is a diagram 1600 illustrating an example of a hardware implementation for an apparatus 1602. The apparatus 1602 may be a BS, a component of a BS, or may implement BS functionality. The apparatus 1602 may include at least one of a CU 1610, a DU 1630, or an RU 1640. For example, depending on the layer functionality handled by the channel tracking component 199, the apparatus 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memories (e.g., the on-chip memory 1612', the on-chip memory 1632', and/or the on-chip memory 1642') and/or the additional memory modules (e.g., the additional memory modules 1614, the additional memory modules 1634, and/or the additional memory modules 1644) may each be considered a computer-readable medium/memory. Each computer-readable medium/memory may be non-transitory. Each of the CU processor 1612, the DU processor 1632, the RU processor 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the channel tracking component 199 is configured to output a model configuration indicative of a model condition of a channel between the network node and a UE; output a measurement resource to the UE to measure a condition of the channel; obtain an SRS; obtain noise covariance information for the model configuration based on a measurement of the condition of the channel, the noise covariance information associated with the SRS; and track a variation in the condition of the channel relative to a first model condition of the channel, the first model condition being based on the SRS and the noise covariance information.

The channel tracking component 199 may be within one or more processors of one or more of the CU 1610, DU 1630, and the RU 1640. The channel tracking component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The apparatus 1302 may include a variety of components configured for various functions. For example, the channel tracking component 199 may include one or more hardware components that perform each of the blocks of the algorithm in the flowcharts of FIGS. 12 and/or 15.

In one configuration, the apparatus 1302 includes means for performing any of the aspects of the methods of FIGS. 12 and/or 15.

The means may be the channel tracking component 199 of the apparatus 1602 configured to perform the functions recited by the means. As described supra, the apparatus 1602 may include the TX processor 316, the RX processor 370, and the controller/processor 375. As such, in one configuration, the means may be the TX processor 316, the RX processor 370, and/or the controller/processor 375 configured to perform the functions recited by the means.

Aspects disclosed herein facilitate model-based uplink-downlink channel tracking that may address channel variations. Such aspects may improve communications between a UE and network by, for example, conserving wireless resources and reducing signaling overhead. In some examples, a reduction of the overhead may be advantageous for high mobility use cases, such as for UEs moving at speeds of 30-500 kmph, applications associated with IIoT procedures, automotive applications, highway application, high-speed train applications, etc.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising: receiving, from a network node, a model configuration indicative of a model condition of a channel between the UE and the network node; receiving a measurement resource from the network node to measure a condition of the channel; transmitting, to the network node, an SRS; and transmitting, to the network node, noise covariance information for the model configuration based on a measurement of the condition of the channel, the noise covariance information associated with the SRS.

In aspect 2, the method of aspect 1 further includes transmitting a channel measurement report, the channel measurement report including the noise covariance information.

In aspect 3, the method of aspect 2 further includes that the SRS includes a non-precoded SRS.

In aspect 4, the method of aspect 2 or aspect 3 further includes receiving an indication indicating to transmit the noise covariance information.

In aspect 5, the method of aspect 4 further includes that the model configuration includes the indication.

In aspect 6, the method of any of aspects 2-5 further includes receiving one or more model parameters for a first model condition of the channel, the one or more model parameters based in part on the SRS and the noise covariance information; tracking a variation in the condition of the channel relative to the first model condition; transmitting a second SRS; and transmitting second noise covariance information for the model configuration based on the variation in the condition of the channel.

In aspect 7, the method of aspect 1 further includes receiving an indication to precode the SRS; and applying precoding to the SRS based on the indication, wherein the SRS is precoded using the noise covariance information.

In aspect 8, the method of aspect 7 further includes that the model configuration includes the indication to precode the SRS.

In aspect 9, the method of aspect 7 or aspect 8 further includes receiving one or more model parameters for a first model condition of the channel, the one or more model parameters based in part on the SRS being precoded using the noise covariance information; tracking a variation in the condition of the channel relative to the first model condition; and transmitting a second SRS precoded using second noise covariance information for the model configuration, the second noise covariance information based on the variation in the condition of the channel.

In aspect 10, the method of aspect 1 further includes receiving a first indication to precode the SRS; receiving a second indication to report a scaling indicator associated with the SRS; generating a normalized noise covariance matrix based on the noise covariance information and a scaling factor matrix; applying precoding to the SRS based on the first indication, wherein the SRS is precoded using the normalized noise covariance matrix; and transmitting the scaling factor matrix based on the second indication to report the scaling indicator.

In aspect 11, the method of aspect 10 further includes that the scaling factor matrix includes a diagonal matrix.

In aspect 12, the method of aspect 10 or aspect 11 further includes that each column of the normalized noise covariance matrix corresponds to a respective transmit power, and the respective transmit power satisfies at least one of a per-transmit port power constraint of the UE or an uplink transmit strategy.

In aspect 13, the method of any of aspects 10-12 further includes that the model configuration includes the first indication to precode the SRS and the second indication to report the scaling indicator.

Aspect 14 is an apparatus for wireless communication at a first device, comprising means for performing the method of any of aspects 1-13.

Aspect 15 is an apparatus for wireless communication including a memory; and at least one processor coupled to the memory and, based at least in part on information stored in the memory, the at least one processor is configured to perform the method of any of aspects 1-13.

In aspect 16, the apparatus of aspect 15 or aspect 16 further includes at least one transceiver or at least one antenna.

Aspect 17 is a non-transitory computer-readable medium storing computer executable code, the code when executed by at least one processor causes the at least one processor to implement a method as in any of aspects 1-13.

Aspect 18 is a method of wireless communication at a network node, comprising: outputting for transmission a model configuration indicative of a model condition of a channel between the network node and a user equipment (UE); outputting for transmission a measurement resource to the UE to measure a condition of the channel; obtaining a sounding reference signal (SRS); obtaining noise covariance information for the model configuration based on a measurement of the condition of the channel, the noise covariance information associated with the SRS; and tracking a variation in the condition of the channel relative to a first model condition of the channel, the first model condition being based on the SRS and the noise covariance information.

In aspect 19, the method of aspect 18 further includes obtaining a channel measurement report, the channel measurement report including the noise covariance information.

In aspect 20, the method of aspect 19 further includes that the SRS includes a non-precoded SRS.

In aspect 21, the method of aspect 19 or 20 further includes outputting an indication indicating to transmit the noise covariance information.

In aspect 22, the method of aspect 21 further includes that the model configuration includes the indication.

In aspect 23, the method of any of aspects 10-22 further includes outputting one or more model parameters for the first model condition of the channel; obtaining a second SRS; obtaining second noise covariance information for the model configuration based on a UE-side variation in the condition of the channel, the second noise covariance information being associated with the second SRS; and outputting one or more updated model parameters for a second model condition of the channel, the second model condition being based in part on the second SRS and the second noise covariance information.

In aspect 24, the method of aspect 18 further includes outputting an indication to precode the SRS, wherein the SRS includes a precoded SRS; obtaining the noise covariance information based on the precoded SRS; obtaining a channel condition based on the precoded SRS; and outputting one or more model parameters for the first model condition of the channel, the one or more model parameters based in part on the channel condition and the noise covariance information.

In aspect 25, the method of aspect 24 further includes that the model configuration includes the indication to precode the SRS.

In aspect 26, the method of aspect 24 or 25 further includes obtaining a second precoded SRS; and outputting one or more updated model parameters for a second model condition of the channel, the second model condition based in part on a second channel condition and second noise covariance information, the second channel condition and the second noise covariance information both obtained from the second precoded SRS.

In aspect 27, the method of aspect 18 further includes outputting a first indication to precode the SRS, wherein the SRS includes a precoded SRS; outputting a second indication to report a scaling indicator associated with the SRS; obtaining a scaling factor matrix based on the second indication to report the scaling indicator; obtaining a channel condition and the noise covariance information based on the precoded SRS; and outputting one or more model parameters for the first model condition of the channel, the one or more model parameters based in part on the channel condition and the noise covariance information.

In aspect 28, the method of aspect 27 further includes that the scaling factor matrix includes a diagonal matrix.

In aspect 29, the method of aspect 27 or 28 further includes that the model configuration includes the first indication to precode the SRS and the second indication to report the scaling indicator.

Aspect 30 is an apparatus for wireless communication at a first device, comprising means for performing the method of any of aspects 18-29.

Aspect 31 is an apparatus for wireless communication including a memory; and at least one processor coupled to the memory and, based at least in part on information stored in the memory, the at least one processor is configured to perform the method of any of aspects 18-29.

In aspect 32, the apparatus of aspect 30 or aspect 31 further includes at least one transceiver or at least one antenna.

Aspect 33 is a non-transitory computer-readable medium storing computer executable code, the code when executed by at least one processor causes the at least one processor to implement a method as in any of aspects 18-29.

What is claimed is:

1. A method of wireless communication at a user equipment (UE), comprising:
    receiving, from a network node, a model configuration including one or more initial model parameters for a channel model indicative of an initial model condition of a channel between the UE and the network node;
    receiving a measurement resource from the network node to measure a condition of the channel;
    transmitting, to the network node, a sounding reference signal (SRS); and
    transmitting, to the network node, noise covariance information for updating the channel model based on a measurement of the condition of the channel.

2. The method of claim 1, further comprising:
    transmitting a channel measurement report, the channel measurement report including the noise covariance information.

3. The method of claim 2, wherein the SRS includes a non-precoded SRS.

4. The method of claim 2, further comprising:
    receiving an indication indicating to transmit the noise covariance information.

5. The method of claim 4, wherein the model configuration includes the indication.

6. The method of claim 2, wherein the one or more initial model parameters for the channel model comprise one or more of a channel state, a state transition matrix, and a state space noise covariance used to define a state of the channel model, wherein the channel model is a model representing the channel, the method further comprising:
    receiving one or more updated model parameters for an updated model condition of the channel, the one or more updated model parameters based in part on the SRS and the noise covariance information;
    tracking a variation in the condition of the channel relative to the updated model condition;
    transmitting a second SRS; and
    transmitting second noise covariance information for updating the channel model based on the variation in the condition of the channel.

7. The method of claim 1, further comprising:
    receiving an indication to precode the SRS; and
    applying precoding to the SRS based on the indication, wherein the SRS is precoded using the noise covariance information.

8. The method of claim 7, wherein the model configuration includes the indication to precode the SRS.

9. The method of claim 7, wherein the one or more initial model parameters comprise one or more of a channel state, a state transition matrix, and a state space noise covariance, the method further comprising:
    receiving one or more updated model parameters for an updated model condition of the channel, the one or more updated model parameters based in part on the SRS being precoded using the noise covariance information;
    tracking a variation in the condition of the channel relative to the updated model condition; and
    transmitting a second SRS precoded using second noise covariance information for updating the channel model, wherein the second noise covariance information is based on the variation in the condition of the channel.

10. The method of claim 1, further comprising:
    receiving a first indication to precode the SRS;
    receiving a second indication to report a scaling indicator associated with the SRS;
    generating a normalized noise covariance matrix based on the noise covariance information and a scaling factor matrix;
    applying precoding to the SRS based on the first indication, wherein the SRS is precoded using the normalized noise covariance matrix; and
    transmitting the scaling factor matrix based on the second indication to report the scaling indicator.

11. The method of claim 10, wherein the scaling factor matrix includes a diagonal matrix.

12. The method of claim 10, wherein each column of the normalized noise covariance matrix corresponds to a respective transmit power, and the respective transmit power satisfies at least one of a per-transmit port power constraint of the UE or an uplink transmit strategy.

13. The method of claim 10, wherein the model configuration includes the first indication to precode the SRS and the second indication to report the scaling indicator.

14. An apparatus for wireless communication at a user equipment (UE), comprising:
    memory; and at least one processor coupled to the memory and, based at least in part on information stored in the memory, the at least one processor is configured to:
  receive, from a network node, a model configuration including one or more initial model parameters for a channel model indicative of an initial model condition of a channel between the UE and the network node;
  receive a measurement resource from the network node to measure a condition of the channel;
  transmit, to the network node, a sounding reference signal (SRS); and
  transmit, to the network node, noise covariance information for updating the channel model based on a measurement of the condition of the channel.

15. The apparatus of claim 14, further comprising:
at least one of a transceiver or an antenna coupled to the at least one processor and configured to:
  transmit a channel measurement report, the channel measurement report including the noise covariance information.

16. The apparatus of claim 15, wherein the SRS includes a non-precoded SRS.

17. The apparatus of claim 15, wherein the at least one processor is further configured to:
  receive an indication indicating to transmit the noise covariance information.

18. The apparatus of claim 17, wherein the model configuration includes the indication.

19. The apparatus of claim 15, wherein the one or more initial model parameters comprise one or more of a channel state, a state transition matrix, and a state space noise covariance, and wherein the at least one processor is further configured to:
  receive one or more updated model parameters for an updated model condition of the channel, the one or more updated model parameters based in part on the SRS and the noise covariance information;
  track a variation in the condition of the channel relative to the updated model condition;
  transmit a second SRS; and
  transmit second noise covariance information for updating the channel model based on the variation in the condition of the channel.

20. The apparatus of claim 14, wherein the at least one processor is further configured to:
  receive an indication to precode the SRS; and
  apply precoding to the SRS based on the indication, wherein the SRS is precoded using the noise covariance information.

21. The apparatus of claim 20, wherein the model configuration includes the indication to precode the SRS.

22. The apparatus of claim 20, wherein the one or more initial model parameters comprise one or more of a channel state, a state transition matrix, and a state space noise covariance, and wherein the at least one processor is further configured to:
  receive one or more updated model parameters for an updated model condition of the channel, the one or more updated model parameters based in part on the SRS being precoded using the noise covariance information;
  track a variation in the condition of the channel relative to the updated model condition; and
  transmit a second SRS precoded using second noise covariance information for updating the channel model, the second noise covariance information based on the variation in the condition of the channel.

23. The apparatus of claim 14, wherein the at least one processor is further configured to:
  receive a first indication to precode the SRS;
  receive a second indication to report a scaling indicator associated with the SRS;
  generate a normalized noise covariance matrix based on the noise covariance information and a scaling factor matrix;
  apply precoding to the SRS based on the first indication, wherein the SRS is precoded using the normalized noise covariance matrix; and
  transmit the scaling factor matrix based on the second indication to report the scaling indicator.

24. The apparatus of claim 23, wherein the scaling factor matrix includes a diagonal matrix.

25. The apparatus of claim 23, wherein each column of the normalized noise covariance matrix corresponds to a respective transmit power, and the respective transmit power satisfies at least one of a per-transmit port power constraint of the UE or an uplink transmit strategy.

26. The apparatus of claim 23, wherein the model configuration includes the first indication to precode the SRS and the second indication to report the scaling indicator.

27. An apparatus for wireless communication at a network node, comprising:
memory; and
at least one processor coupled to the memory and, based at least in part on information stored in the memory, the at least one processor is configured to:
  output a model configuration including one or more initial model parameters for a channel model indicative of an initial model condition of a channel between the network node and a user equipment (UE);
  output a measurement resource to the UE to measure a condition of the channel;
  obtain a sounding reference signal (SRS);
  obtain noise covariance information for updating the channel model based on a measurement of the condition of the channel, wherein the noise covariance information is associated with the SRS; and
  track a variation in the condition of the channel relative to a first model condition of the channel, the first model condition being based on the SRS and the noise covariance information.

28. The apparatus of claim 27, wherein the at least one processor is further configured to:
  obtain a channel measurement report, the channel measurement report including the noise covariance information, wherein the SRS includes a non-precoded SRS.

29. The apparatus of claim 27, wherein the one or more initial model parameters comprise one or more of a channel state, a state transition matrix, and a state space noise covariance, and wherein the at least one processor is further configured to:
  output an indication to precode the SRS, wherein the SRS includes a precoded SRS;
  obtain the noise covariance information based on the precoded SRS;
  obtain a channel condition based on the precoded SRS; and
  output one or more updated model parameters for the first model condition of the channel, the one or more updated model parameters based in part on the channel condition and the noise covariance information.

30. The apparatus of claim 27, wherein the one or more initial model parameters comprise one or more of a channel state, a state transition matrix, and a state space noise covariance, and wherein the at least one processor is further configured to:
- output a first indication to precode the SRS, wherein the SRS includes a precoded SRS;
- output a second indication to report a scaling indicator associated with the SRS;
- obtain a scaling factor matrix based on the second indication to report the scaling indicator;
- obtain a channel condition and the noise covariance information based on the precoded SRS; and
- output one or more updated model parameters for the first model condition of the channel, the one or more updated model parameters based in part on the channel condition and the noise covariance information.

* * * * *